United States Patent
Fukaya et al.

(10) Patent No.: US 9,340,689 B2
(45) Date of Patent: May 17, 2016

(54) WATER-BASED INK FOR INK-JET RECORDING, WATER-BASED INK SET FOR INK-JET RECORDING, AND TREATMENT AGENT

(71) Applicant: Brother Kogyo Kabushiki Kaisha, Nagoya-shi, Aichi-ken (JP)

(72) Inventors: Hideji Fukaya, Nisshin (JP); Yasuhiro Taga, Kani (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/657,674

(22) Filed: Mar. 13, 2015

(65) Prior Publication Data
US 2015/0259552 A1    Sep. 17, 2015

(30) Foreign Application Priority Data

Mar. 15, 2014  (JP) ................... 2014-052848
Mar. 15, 2014  (JP) ................... 2014-052850
Sep. 29, 2014  (JP) ................... 2014-199314

(51) Int. Cl.
*C09D 11/54*    (2014.01)
*C09D 11/30*    (2014.01)
*C09D 11/322*   (2014.01)
*C09D 11/14*    (2006.01)

(52) U.S. Cl.
CPC .............. *C09D 11/322* (2013.01); *C09D 11/14* (2013.01); *C09D 11/54* (2013.01)

(58) Field of Classification Search
CPC ........ C09D 11/54; C09D 11/322; C09D 11/14
See application file for complete search history.

(56) References Cited

U.S. PATENT DOCUMENTS

| | | | |
|---|---|---|---|
| 5,554,739 | A | 9/1996 | Belmont |
| 5,571,311 | A | 11/1996 | Belmont et al. |
| 5,609,671 | A | 3/1997 | Nagasawa |
| 5,630,868 | A | 5/1997 | Belmont et al. |
| 5,672,198 | A | 9/1997 | Belmont |
| 5,713,988 | A | 2/1998 | Belmont et al. |
| 5,837,045 | A | 11/1998 | Johnson et al. |
| 5,851,280 | A | 12/1998 | Belmont et al. |
| 5,900,029 | A | 5/1999 | Belmont et al. |
| 5,985,016 | A | 11/1999 | Tsang et al. |
| 6,042,643 | A | 3/2000 | Belmont et al. |
| 6,150,433 | A * | 11/2000 | Tsang ............... C09D 11/32 106/31.6 |
| 6,494,946 | B1 | 12/2002 | Belmont et al. |
| 7,553,883 | B2 | 6/2009 | Yatake |

(Continued)

FOREIGN PATENT DOCUMENTS

JP    H083498 A    1/1996
JP    H11193361 A  7/1999

(Continued)

OTHER PUBLICATIONS

Mar. 18, 2015—(US) Co-pending U.S. Appl. No. 14/661,239.

(Continued)

*Primary Examiner* — Veronica F Faison
(74) *Attorney, Agent, or Firm* — Banner & Witcoff, Ltd.

(57) ABSTRACT

A water-based ink for ink-jet recording includes a self-dispersible pigment which is modified with phosphate group, at least one of dextran and a derivative thereof, and water.

23 Claims, 3 Drawing Sheets

(56) References Cited

U.S. PATENT DOCUMENTS

| | | |
|---|---|---|
| 7,819,962 B2 | 10/2010 | Gu |
| 8,016,404 B2 | 9/2011 | Kato et al. |
| 8,727,523 B2 | 5/2014 | Tamai et al. |
| 8,858,695 B2 | 10/2014 | Gu et al. |
| 2003/0095914 A1 | 5/2003 | Belmont et al. |
| 2004/0241348 A1* | 12/2004 | Koga ................ B41M 5/0035 428/32.1 |
| 2005/0034629 A1 | 2/2005 | Belmont et al. |
| 2006/0058420 A1 | 3/2006 | Yatake |
| 2007/0100023 A1 | 5/2007 | Burns et al. |
| 2007/0100024 A1 | 5/2007 | Gu et al. |
| 2008/0118657 A1 | 5/2008 | Taverizatshy et al. |
| 2008/0241398 A1 | 10/2008 | Kato et al. |
| 2009/0229489 A1 | 9/2009 | Gu |
| 2011/0011307 A1 | 1/2011 | Shakhnovich et al. |
| 2011/0249058 A1 | 10/2011 | Shibata et al. |
| 2012/0236066 A1 | 9/2012 | Tamai et al. |
| 2013/0224451 A1 | 8/2013 | Shiono et al. |

FOREIGN PATENT DOCUMENTS

| | | |
|---|---|---|
| JP | H11222573 A | 8/1999 |
| JP | 2000-513396 A | 10/2000 |
| JP | 2000-313830 A | 11/2000 |
| JP | 2001-115069 A | 4/2001 |
| JP | 2006-002141 A | 1/2006 |
| JP | 2006-159422 A | 6/2006 |
| JP | 2006-199968 A | 8/2006 |
| JP | 2007-246656 A | 9/2007 |
| JP | 2008-246821 A | 10/2008 |
| JP | 2009-513802 A | 4/2009 |
| JP | 2009-515007 A | 4/2009 |
| JP | 2011-510155 A | 3/2011 |
| JP | 2011-515535 A | 5/2011 |
| JP | 2012-087309 A | 5/2012 |
| JP | 2012207210 A | 10/2012 |
| JP | 2013-181055 A | 9/2013 |
| WO | 9748769 A1 | 12/1997 |
| WO | 2007053563 A2 | 5/2007 |
| WO | 2009094178 A2 | 7/2009 |

OTHER PUBLICATIONS

Mar. 13, 2015—(US) Co-pending U.S. Appl. No. 14/657,607.
Sep. 15, 2015—(US) Non-Final Office Action—U.S. Appl. No. 14/661,239.
Oct. 9, 2015—(US) Notice of Allowance—U.S. Appl. No. 14/657,607.
Feb. 22, 2016—(US) Notice of Allowance—U.S. Appl. No. 14/661,239.

\* cited by examiner

WATER-BASED INK FOR INK-JET RECORDING, WATER-BASED INK SET FOR INK-JET RECORDING, AND TREATMENT AGENT

CROSS REFERENCE TO RELATED APPLICATION

The present application claims priority from Japanese Patent Application No. 2014-052848 filed on Mar. 15, 2014, Japanese Patent Application No. 2014-052850 filed on Mar. 15, 2014 and Japanese Patent Application No. 2014-199314 filed on Sep. 29, 2014 the disclosure of which are incorporated herein by reference in their entirety.

BACKGROUND OF THE INVENTION

1. Field of the Invention

The present invention relates to a water-based ink for ink-jet recording, an water-based ink set for ink-jet recording, and a treatment agent.

2. Description of the Related Art

In order to improve the optical density (OD value) and the chromaticness, it has been suggested that a water-dispersible polymer is contained in a water-based pigment ink (for example, Japanese Patent Application Laid-open Nos. 2006-2141 corresponding to United States Patent Application Publication No. 2006/0058420 and Japanese Patent Application Laid-open No. 2012-87309 corresponding to United States Patent Application Publication No. 2006/0058420).

However, it is demanded for the water-based pigment ink to further improve the optical density (OD value) and the chromaticness.

On the other hand, a water-based ink set for ink-jet recording has been suggested, wherein a treatment agent, which unstabilizes a dissolved state or a dispersed state of a colorant (coloring agent) contained in a water-based ink for ink-jet recording, is combined with the water-based ink for ink-jet recording in order to improve the optical density (OD value) (for example, Japanese Patent Application Laid-open No. 2006-159422).

However, it is demanded for the water-based ink set to further improve the optical density (OD value). Furthermore, it is also demanded for the water-based ink set to improve the chromaticness in the color recording.

SUMMARY OF THE INVENTION

In view of the above, an object of the present teaching is to provide a water-based ink for ink-jet recording based on the use of a self-dispersible pigment which makes it possible to further improve the optical density (OD value) and the chromaticness. Furthermore, an object of the present teaching is to provide a water-based ink set for ink-jet recording which makes it possible to further improve the optical density (OD value) and the chromaticness as well.

According to a first aspect of the present teaching, there is provided a water-based ink for ink-jet recording, including a self-dispersible pigment modified with phosphate group; at least one of dextran and a derivative thereof; and water.

According to a second aspect of the present teaching, there is provided a water-based ink set for ink-jet recording, including a water-based ink for ink-jet recording which contains a self-dispersible pigment modified with phosphate group and water; and a treatment agent which contains at least one of dextran and a derivative thereof.

According to a third aspect of the present teaching, there is provided a treatment agent which is to be used for the water-based ink set for ink-jet recording as defined in the second aspect.

DESCRIPTION OF THE PREFERRED EMBODIMENTS

First Embodiment

Figure 1:
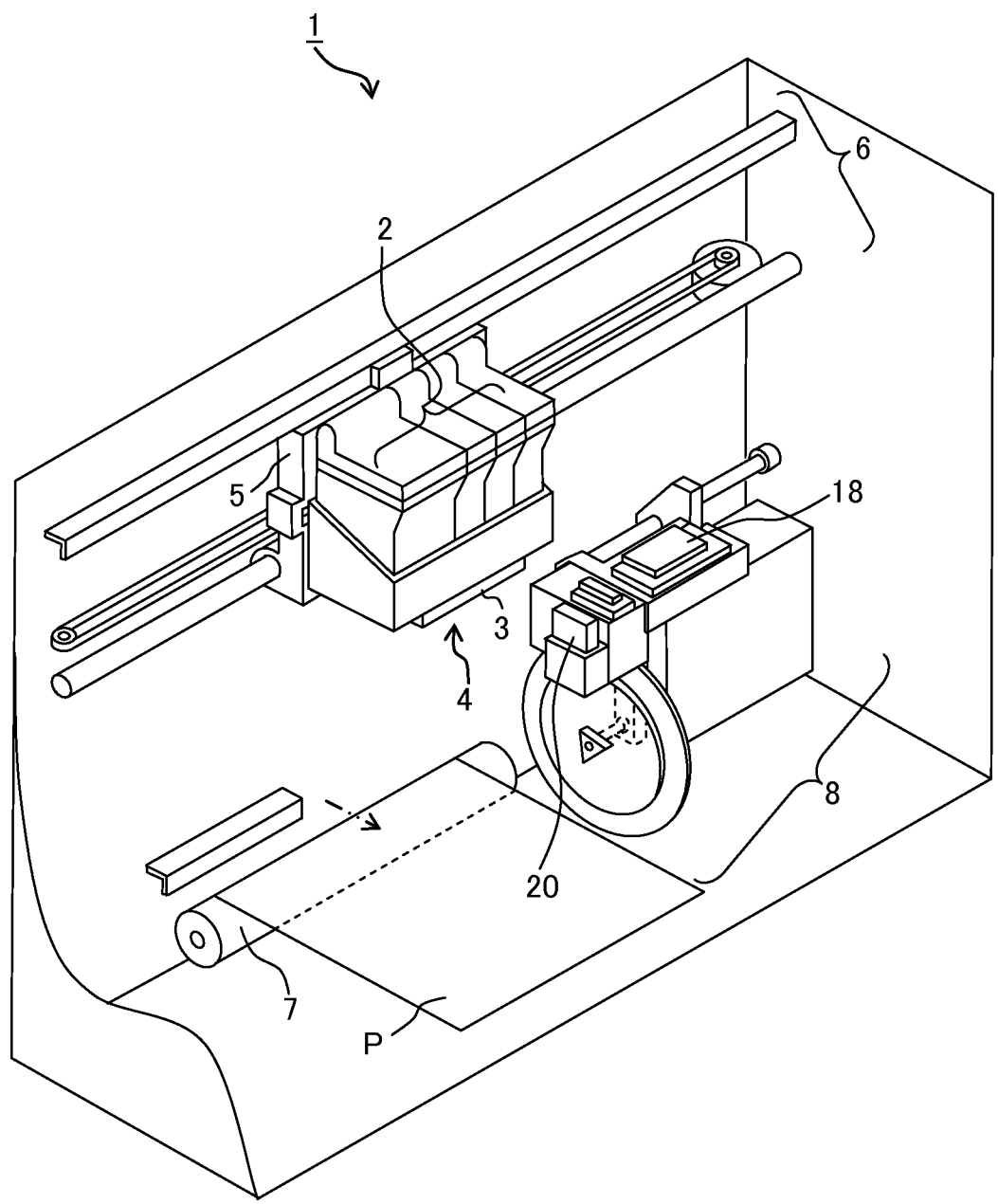
FIG. 1 shows a schematic perspective view illustrating an exemplary arrangement of an ink-jet recording apparatus according to a first embodiment.

In this embodiment, the water-based ink for ink-jet recording (hereinafter referred to as "water-based ink" or "ink" in some cases) will be explained. The water-based ink of this embodiment is exemplified by the water-based black-based ink for ink-jet recording (hereinafter referred to as "water-based black-based ink" or "black-based ink" in some cases) and the water-based chromatic color ink for ink-jet recording (hereinafter referred to as "water-based chromatic color ink", "chromatic color ink" or "color ink" in some cases). The "water-based ink" or the "ink", which is simply referred to in the specification of this application in some cases, means both of the black-based ink and the chromatic color ink.

In this embodiment, the term "black-based" refers to the achromatic color except for the white, and the term includes the black and the gray. Furthermore, the term "chromatic color" means the color other than the achromatic colors of white, black, and gray.

In this embodiment, the phrase "at least one of dextran and a derivative thereof" means that it is also allowable to use dextran singly, it is also allowable to use the dextran derivative singly, or it is also allowable to use a mixture of dextran and the dextran derivative.

The water-based ink of this embodiment contains a colorant, water, and a water-soluble macromolecule. The colorant includes the self-dispersible pigment modified with phosphate group (hereinafter referred to as "phosphate group-modified self-dispersible pigment" in some cases). The phosphate group-modified self-dispersible pigment is exemplified by the self-dispersible black-based pigment modified with phosphate group (hereinafter referred to as "phosphate group-modified self-dispersible black-based pigment" in some cases) and the self-dispersible chromatic color pigment modified with phosphate group (hereinafter referred to as "phosphate group-modified self-dispersible chromatic color pigment" in some cases). The "phosphate group-modified self-dispersible pigment", which is simply referred to in the specification of the present application in some cases, means both of the phosphate group-modified self-dispersible black-based pigment and the phosphate group-modified self-dispersible chromatic color pigment.

The phosphate group-modified self-dispersible pigment can be prepared in accordance with a method described, for example, in Japanese Patent Application Laid-open No. 2009-515007 (PCT) corresponding to United States Patent Application Publication Nos. 2007/0100023 and 2007/

0100024; Japanese Patent Application Laid-open No. 2011-515535 (PCT) corresponding to United States Patent Application Publication No. 2009/0229489; Japanese Patent Application Laid-open No. 2006-199968 corresponding to U.S. Pat. No. 5,554,739, U.S. Pat. No. 5,571,311, U.S. Pat. No. 5,630,868, U.S. Pat. No. 5,672,198, U.S. Pat. No. 5,713,988, U.S. Pat. No. 5,851,280, U.S. Pat. No. 5,900,029, U.S. Pat. No. 6,042,643, U.S. Pat. No. 6,494,946, United States Patent Application Publication No. 2003/0095914, and United States Patent Application Publication No. 2005/0034629; Japanese Patent Application Laid-open No. 2009-513802 (PCT) corresponding to United States Patent Application Publication Nos. 2007/0100023 and 2007/0100024; and Japanese Patent Application Laid-open No. 2011-510155 (PCT) corresponding to United States Patent Application Publication No. 2011/0011307. For example, any commercially available product may be used for the phosphate group-modified self-dispersible pigment. The water-based ink of this embodiment uses the self-dispersible pigment. Therefore, no problem arises in relation to the increase in the viscosity which would be otherwise caused by the macromolecular pigment dispersing agent, and the water-based ink of this embodiment is excellent in the handling performance.

The black-based pigment, which can be used as the raw material for the self-dispersible black-based pigment, is exemplified, for example, by carbon black, inorganic pigment, and organic pigment. The carbon black is exemplified, for example, by furnace black, lamp black, acetylene black, and channel black. The inorganic pigment can be exemplified, for example, by carbon black-based inorganic pigment. The organic pigment is exemplified, for example, by aniline black daylight fluorescent pigment. Pigments other than the above are also exemplified, for example, by C. I. Pigment Blacks 1, 6. In particular, the pigment, which is appropriate to perform the modification with the phosphate group, is exemplified, for example, by carbon blacks such as "MA8" and "MA100" produced by Mitsubishi Chemical Corporation and "Color Black FW200" produced by Degussa.

The pigment, which can be used as the raw material for the self-dispersible chromatic color pigment, is exemplified, for example, by organic pigments. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Pigments other than the above are also exemplified, for example, by C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The phosphate group-modified self-dispersible chromatic color pigment is exemplified, for example, by the self-dispersible magenta pigment modified with phosphate group (hereinafter referred to as "phosphate group-modified self-dispersible magenta pigment" in some cases), the self-dispersible cyan pigment modified with phosphate group (hereinafter referred to as "phosphate group-modified self-dispersible cyan pigment" in some cases), and the self-dispersible yellow pigment modified with phosphate group (hereinafter referred to as "phosphate group-modified self-dispersible yellow pigment" in some cases). The phosphate group-modified self-dispersible chromatic color pigment is preferably the phosphate group-modified self-dispersible magenta pigment and/or the phosphate group-modified self-dispersible cyan pigment.

The solid content blending amount of the phosphate group-modified self-dispersible pigment (pigment solid content amount) with respect to the total amount of the water-based ink is not specifically limited, which can be appropriately determined, for example, on the basis of the desired optical density or the chromaticness. When the phosphate group-modified self-dispersible pigment is the phosphate group-modified self-dispersible black-based pigment, the pigment solid content amount is, for example, 0.1% by weight to 20% by weight, preferably 1% by weight to 15% by weight, and more preferably 2% by weight to 12% by weight.

When the phosphate group-modified self-dispersible pigment is the phosphate group-modified self-dispersible chromatic color pigment, the pigment solid content amount is, for example, 1% by weight to 8% by weight, preferably 2% by weight to 7% by weight, and more preferably 2.5% by weight to 6.5% by weight. When the phosphate group-modified self-dispersible chromatic color pigment is the phosphate group-modified self-dispersible magenta pigment, the pigment solid content amount is, for example, 3% by weight to 7% by weight, and preferably 4% by weight to 6.5% by weight. When the phosphate group-modified self-dispersible chromatic color pigment is the phosphate group-modified self-dispersible cyan pigment, the pigment solid content amount is, for example, 2.5% by weight to 5% by weight, and preferably 2.5% by weight to 4.5% by weight.

The colorant may further include, for example, other pigments and dyes in addition to the phosphate group-modified self-dispersible pigment. However, it is preferable that the colorant is composed of only the phosphate group-modified self-dispersible pigment, and the colorant does not contain any other colorant. When another colorant is used in combination with the phosphate group-modified self-dispersible pigment, the content of the phosphate group-modified self-dispersible pigment with respect to the total amount of the colorant is, for example, 50% by weight to 100% by weight, preferably 80% by weight to 100% by weight, and more preferably 95% by weight to 100% by weight.

It is preferable that the water is ion exchange water or pure water. The blending amount of water (water ratio) with respect to the total amount of the water-based ink is, for example, 10% by weight to 90% by weight, and preferably 40% by weight to 80% by weight. The water ratio may be, for example, the balance of the other components.

As described above, the water-soluble macromolecule includes at least one of dextran and the derivative thereof (hereinafter referred to as "dextran or the like" in some cases). The dextran derivative is exemplified, for example, by carboxyalkyl dextran and salt thereof, sodium dextran sulfate, potassium dextran sulfate, and magnesium dextran sulfate. The alkyl group of the carboxyalkyl dextran and salt thereof is exemplified, for example, by methyl group, ethyl group, n-propyl group, isopropyl group, n-butyl group, isobutyl group, sec-butyl group, tert-butyl group, n-pentyl group, n-hexyl group, n-octyl group, n-nonyl group, n-decyl group, n-undecyl group, and n-dodecyl group. The alkyl group is preferably methyl group, ethyl group, n-propyl group, or isopropyl group. The alkyl group is especially preferably methyl group (the carboxyalkyl dextran and salt thereof is carboxymethyl dextran and salt thereof). Furthermore, the salt of carboxymethyl dextran is preferably sodium carboxymethyl dextran.

The water-soluble macromolecule may further include any other water-soluble macromolecule in addition to dextran or the like. However, it is preferable that the water-soluble macromolecule is composed of only dextran or the like, and any other water-soluble macromolecule is not contained. When another water-soluble macromolecule is used in combination with dextran or the like, the blending amount of dextran or the like with respect to the total amount of the water-soluble macromolecule is, for example, 50% by weight to 100% by weight, preferably 80% by weight to 100% by weight, and more preferably 95% by weight to 100% by weight.

It is preferable that the molecular weight of dextran or the like is, for example, 1,000 to 500,000. When the molecular weight of dextran or the like is not more than 500,000, the increase in viscosity of the ink is not caused, which is preferred. When the phosphate group-modified self-dispersible pigment is the phosphate group-modified self-dispersible black-based pigment, it is more preferable that the molecular weight of dextran or the like is 40,000 to 200,000. When the phosphate group-modified self-dispersible pigment is the phosphate group-modified self-dispersible chromatic color pigment, it is more preferable that the molecular weight of dextran or the like is 40,000 to 150,000. Furthermore, it is also appropriate that the molecular weight of dextran or the like is 10,000 to 40,000.

When the phosphate group-modified self-dispersible pigment is the phosphate group-modified self-dispersible black-based pigment, the blending amount of dextran or the like with respect to the total amount of the water-based black-based ink (ratio of dextran or the like) is, for example, 0.2% by weight to 10% by weight, and preferably 0.3% by weight to 5% by weight. When the ratio of dextran or the like is not less than 0.3% by weight, it is possible to obtain the water-based black-based ink which has the higher optical density (OD value). Furthermore, when the ratio of dextran or the like is not more than 5% by weight, it is possible to obtain the water-based black-based ink which is more excellent in the storage stability.

In the water-based black-based ink, the weight ratio between the pigment solid content amount (X) and dextran or the like (Y) fulfills, for example, X:Y=1:0.03 to 2 (weight ratio (Y/X) of a weight (Y) of dextran or the like to a weight (X) of the phosphate group-modified self-dispersible black-based pigment: Y/X=0.03 to 2), and preferably X:Y=1:0.04 to 1.25 (weight ratio Y/X=0.04 to 1.25). When X:Y is not less than 1:0.04 (weight ratio Y/X is not less than 0.04), it is possible to obtain the water-based black-based ink which has the higher optical density (OD value). Furthermore, when X:Y is not more than 1:1.25 (weight ratio Y/X is not more than 1.25), it is possible to obtain the water-based black-based ink which is more excellent in the storage stability.

When the phosphate group-modified self-dispersible pigment is the phosphate group-modified self-dispersible chromatic color pigment, the blending amount of dextran or the like with respect to the total amount of the water-based ink (ratio of dextran or the like) is, for example, 0.2% by weight to 6% by weight, preferably 0.4% by weight to 5% by weight, and more preferably 0.7% by weight to 4% by weight.

When the phosphate group-modified self-dispersible chromatic color pigment is the phosphate group-modified self-dispersible magenta pigment, the ratio of dextran or the like is, for example, 0.4% by weight to 3.3% by weight, preferably 0.4% by weight to 3% by weight, more preferably 0.4% by weight to 2.5% by weight, and much more preferably 0.7% by weight to 2.5% by weight. When the ratio of dextran or the like is 0.4% by weight to 2.5% by weight, it is possible to obtain the water-based ink which is more excellent in the vaporization characteristic.

When the phosphate group-modified self-dispersible chromatic color pigment is the phosphate group-modified self-dispersible cyan pigment, the ratio of dextran or the like is, for example, 1% by weight to 5% by weight, preferably 1% by weight to 4.5% by weight, more preferably 1% by weight to 4% by weight, and much more preferably 1.5% by weight to 4% by weight. When the ratio of dextran or the like is 1% by weight to 4.5% by weight, it is possible to obtain the water-based ink which is more excellent in the vaporization characteristic.

In the chromatic color ink, the weight ratio of the solid content amount (X) of the phosphate group-modified self-dispersible pigment with respect to the blending amount (Y) of dextran or the like fulfills, for example, X/Y=0.5 to 20, preferably X/Y=1 to 13, and more preferably X/Y=1 to 7.

When the phosphate group-modified self-dispersible chromatic color pigment is the phosphate group-modified self-dispersible magenta pigment, it is preferable that the weight ratio fulfills X/Y=2 to 7. When the weight ratio X/Y is 2 to 7, the pigment solid content amount is 4% by weight to 6.5% by weight, and carboxymethyl dextran is used as the dextran or the like, then it is possible to obtain the water-based ink in which the chromaticness is more improved, and the vaporization characteristic is more excellent.

When the phosphate group-modified self-dispersible chromatic color pigment is the phosphate group-modified self-dispersible cyan pigment, it is preferable that the weight ratio fulfills X/Y=1 to 2.7. When the weight ratio X/Y is 1 to 2.7, the pigment solid content amount is 2.5% by weight to 4.5% by weight, and carboxymethyl dextran is used as the dextran or the like, then it is possible to obtain the water-based ink in which the chromaticness is more improved, and the vaporization characteristic is more excellent.

The mechanism for improving the optical density (OD value) and the chromaticness according to the water-based ink of this embodiment is estimated, for example, as follows. Dextran or the like has the regular structure containing a large amount of 1,6 bond. It is considered that the regular structure of dextran or the like as described above causes any interaction with the phosphate group of the phosphate group-modified self-dispersible pigment, and thus the optical density (OD value) and the chromaticness are improved. On the other hand, for example, starch is a macromolecule including D-glucopyranose. However, starch is composed of amylose which has α-1,4 bond and amylopectin which has the amylose skeleton and which has a large number of branched structures of α-1,6 bond. Starch has the structure which is not regular, and starch does not have any functional group as well. Therefore, it is considered that the optical density (OD value) and the chromaticness are not improved thereby. On the other hand, when carboxymethyl dextran or the salt thereof is used as dextran or the like, it is speculated that the interaction is strong between the carboxymethyl group and the phosphate group of the phosphate group-modified self-dispersible pigment. Accordingly, the phosphate group-modified self-dispersible pigment stays at the surface layer on the recording medium. Thus, it is considered that the optical density and the chromaticness are further improved greatly. However, this mechanism is merely estimated, and this embodiment is not limited thereto. The water-based ink of this embodiment makes it possible to further improve the optical density (OD value) and the chromaticness as shown in Examples described later on owing to the fact that the pigment modified with the phosphate group is used as the self-dispersible pigment and dextran or the like is blended.

It is preferable that the water-based ink of this embodiment further contains a water-soluble organic solvent. The water-soluble organic solvent is exemplified, for example, by a humectant (moistening agent) which prevents the water-based ink from being dried at the nozzle forward end portion of the ink-jet head and a penetrant (permeating agent) which adjusts the drying speed on the recording medium.

The humectant described above is not specifically limited. The humectant is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycols; polyhydric alcohols such as alkylene glycols, glycerol, trimethylolpropane and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. One type of the humectant as described above may be used singly, or two or more types of the humectants as described above may be used in combination. Among them, it is preferable to use polyhydric alcohol such as alkylene glycol and glycerol.

The blending amount of the humectant with respect to the total amount of the water-based ink is, for example, 0% by weight to 95% by weight, preferably 5% by weight to 80% by weight, and more preferably 5% by weight to 50% by weight.

The penetrant is exemplified, for example, by glycol ether. The glycol ether is exemplified, for example, by ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the penetrant as described above may be used singly, or two or more types of the penetrants as described above may be used in combination.

The blending amount of the penetrant with respect to the total amount of the water-based ink is, for example, 0% by weight to 20% by weight, preferably 0.1% by weight to 15% by weight, and more preferably 0.5% by weight to 10% by weight.

The water-based ink may further contain conventionally known additives, if necessary. The additive includes, for example, surfactants, pH-adjusting agents, viscosity-adjusting agents, surface tension-adjusting agents, and antifungal agents (fungicides). The viscosity-adjusting agent includes, for example, polyvinyl alcohol, cellulose, and water-soluble resin.

The water-based ink described above can be prepared, for example, such that the colorant, water, the water-soluble macromolecule, and optionally other additive components are mixed uniformly or homogeneously in accordance with any conventionally known method, and undissolved matters are removed by means of a filter or the like.

Next, the ink cartridge of this embodiment resides in an ink cartridge including a water-based ink for ink-jet recording, wherein the water-based ink is the water-based ink for ink-jet recording of this embodiment. For example, any conventionally known main body can be used as the main body of the ink cartridge.

Next, the ink-jet recording apparatus and the ink-jet recording method of this embodiment will be explained.

The ink-jet recording apparatus of this embodiment resides in an ink-jet recording apparatus including an ink accommodating unit and an ink discharge mechanism for discharging an ink accommodated in the ink accommodating unit by the ink discharge mechanism, wherein the water-based ink for ink-jet recording of this embodiment is accommodated in the ink accommodating unit.

The ink-jet recording method of this embodiment resides in an ink-jet recording method for performing recording by discharging a water-based ink onto a recording medium in accordance with an ink-jet system, wherein the water-based ink for ink-jet recording of this embodiment is used as the water-based ink.

The ink-jet recording method of this embodiment can be carried out, for example, by using the ink-jet recording apparatus of this embodiment. The recording includes, for example, the letter (character) printing, the image printing, and the printing (print or presswork).

FIG. 1 shows an exemplary construction of the ink-jet recording apparatus of this embodiment. The ink-jet recording apparatus of this example is a serial type ink-jet recording apparatus in which a serial type ink-jet head is adopted. As shown in FIG. 1, the ink-jet recording apparatus 1 includes, as main constitutive components, four ink cartridges 2, an ink discharge mechanism (serial type ink-jet head) 3, a head unit 4, a carriage 5, a driving unit 6, a platen roller 7, and a purge apparatus 8.

Each of the four ink cartridges 2 contains one color of each of four colors of water-based inks of yellow, magenta, cyan, and black. For example, at least one of the four color inks is the water-based ink for ink-jet recording of this embodiment. It is also allowable that any general water-based ink is usable for the other water-based inks. The ink-jet head 3, which is installed for the head unit 4, performs the recording on the recording medium (for example, recording paper) P. The four ink cartridges 2 and the head unit 4 are carried on the carriage 5. The driving unit 6 reciprocatively moves the carriage 5 in the straight line direction. For example, those conventionally known can be used as the driving unit 6 (see, for example, Japanese Patent Application Laid-open No. 2008-246821 corresponding to United States Patent Application Publication No. 2008/0241398). The platen roller 7 extends in the reciprocating direction of the carriage 5, and the platen roller 7 is arranged opposingly to the ink-jet head 3.

The purge apparatus 8 sucks any defective ink containing, for example, bubbles accumulated in the ink-jet head 3. For example, those conventionally known can be used as the purge apparatus 8 (see, for example, Japanese Patent Application Laid-open No. 2008-246821 corresponding to United States Patent Application Publication No. 2008/0241398).

A wiper member 20 is arranged adjacently to the purge apparatus 8 on the platen roller 7 side of the purge apparatus 8. The wiper member 20 is formed to have a spatula-shaped form. The wiper member 20 wipes out the nozzle-formed surface of the ink-jet head 3 in accordance with the movement of the carriage 5. With reference to FIG. 1, a cap 18 covers a plurality of nozzles of the ink-jet head 3 which is to be returned to the reset position when the recording is completed, in order to prevent the water-based inks from being dried.

In the ink-jet recording apparatus 1 of this example, the four ink cartridges 2 are carried on one carriage 5 together with the head unit 4. However, this embodiment is not limited thereto. In the ink-jet recording apparatus 1, each of the cartridges of the four ink cartridges 2 may be carried on any carriage distinct from the head unit 4. Alternatively, it is also allowable that the respective cartridges of the four ink cartridges 2 are not carried on the carriage 5, and they are arranged and fixed in the ink-jet recording apparatus 1. In the embodiments as described above, for example, the respective cartridges of the four ink cartridges 2 are connected to the head unit 4 carried on the carriage 5, for example, by tubes or the like, and the water-based inks are supplied from the respective cartridges of the four ink cartridges 2 to the head unit 4.

The ink-jet recording, which is based on the use of the ink-jet recording apparatus 1, is carried out, for example, as follows. At first, the recording paper P is fed from a paper feed cassette (not shown) provided at a side portion or a lower portion of the ink-jet recording apparatus 1. The recording paper P is introduced into the space between the ink-jet head 3 and the platen roller 7. The predetermined recording is performed on the introduced recording paper P by the water-based inks discharged from the ink-jet head 3. The recording paper P after the recording is discharged from the ink-jet recording apparatus 1. The recorded matter, which is recorded by using the water-based black-based ink of this embodiment, has the high optical density (OD value). Furthermore, the recorded matter, which is recorded by using the chromatic color ink of this embodiment, has the high chromaticness. A paper feed mechanism and a paper discharge mechanism for the recording paper P are omitted from the illustration in FIG. 1.

The apparatus shown in FIG. 1 adopts the serial type ink-jet head. However, this embodiment is not limited thereto. The ink-jet recording apparatus may be an apparatus which adopts a line type ink-jet head.

As explained above, the water-based ink for ink-jet recording of this embodiment makes it possible to further improve the optical density (OD value) and the chromaticness, owing to the fact that the pigment, which is modified with the phosphate group, is used as the self-dispersible pigment, and at least one of dextran and the derivative thereof is blended.

Second Embodiment

In this embodiment, an explanation will be made about the water-based ink set for ink-jet recording (hereinafter referred to as "water-based ink set" or "ink set" in some cases). The water-based ink set of this embodiment includes a water-based ink for ink-jet recording and a treatment agent. In the first embodiment, the water-based ink contains dextran or the like. However, in this embodiment, the treatment agent contains dextran or the like.

At first, the water-based ink of this embodiment will be explained. The water-based ink of this embodiment contains a colorant and water. The colorant contains a self-dispersible pigment modified with phosphate group (phosphate group-modified self-dispersible pigment). The same or equivalent phosphate group-modified self-dispersible pigment and water as those of the first embodiment can be used in the same or equivalent blending amounts. Furthermore, it is preferable that the water-based ink further contains a water-soluble organic solvent. The same or equivalent water-soluble organic solvent as that of the first embodiment can be used in the same or equivalent blending amount. The water-based ink may further contains any conventionally known additive, if necessary.

In the case of the water-based ink set of this embodiment, when the water-based ink is applied to the recording medium prior to the treatment agent, it is preferable that the water-based ink does not contain the penetrant and the surfactant, or the water-based ink has a small blending amount thereof, and the permeability is low. Accordingly, the water-based ink is easily brought in contact with the treatment agent which is applied to the recording medium thereafter. It is possible to obtain the water-based ink set in which the optical density (OD value) and the chromaticness are more improved. The surface tension of the water-based ink is, for example, 20 mN/m to 50 mN/m, preferably 25 mN/m to 45 mN/m, and more preferably 30 mN/m to 40 mN/m.

The water-based ink described above can be prepared, for example, such that the colorant, water, and optionally other additive components are mixed uniformly or homogeneously in accordance with any conventionally known method, and undissolved matters are removed by a filter or the like, in the same manner as in the first embodiment.

Next, the treatment agent will be explained. The feature of the treatment agent is to contain at least one of dextran and the derivative thereof ("dextran or the like"). The other components are not specifically limited. Those which are the same as or equivalent to those of the first embodiment can be used as dextran or the like.

The blending amount of dextran or the like with respect to the total amount of the treatment agent (ratio of dextran or the like) is, for example, 0.1% by weight to 18% by weight, preferably 1% by weight to 18% by weight, and more preferably 5% by weight to 18% by weight, in view of the discharge stability.

The mechanism for improving the optical density (OD value) and the chromaticness according to the water-based ink set of this embodiment is speculated to be the same or equivalent to the mechanism for improving the optical density (OD value) and the chromaticness according to the water-based ink of the first embodiment described above. Furthermore, the blending of dextran or the like, in which dextran or the like is blended with the treatment agent without being blended with the water-based ink containing the phosphate group-modified self-dispersible pigment, has the following advantage. That is, if a large amount of dextran or the like is blended to the water-based ink, any aggregation occurs. Therefore, the blending amount of dextran or the like is restricted. However, in the case of the treatment agent, there is no such restriction. Therefore, it is easy to obtain the effect to improve the optical density (OD value) and the chromaticness.

In the water-based ink set of this embodiment, it is preferable that the phosphate group-modified self-dispersible pigment contained in the water-based ink is self-dispersible carbon black modified with the phosphate group, and the blending amount of dextran or the like with respect to the total amount of the treatment agent is 1% by weight to 18% by weight. Accordingly, it is possible to obtain the water-based ink set in which the optical density (OD value) is further improved.

In the water-based ink set of the present teaching, it is preferable that the phosphate group-modified self-dispersible pigment contained in the water-based ink is self-dispersible C. I. Pigment Red 122 modified with the phosphate group, and the blending amount of dextran or the like with respect to the total amount of the treatment agent is 10% by weight to 18% by weight. Accordingly, it is possible to obtain the water-based ink set in which the chromaticness is further improved.

In the water-based ink set described above, the ratio of the solid content amount (X1:% by weight) of the phosphate group-modified self-dispersible pigment contained in the water-based ink to the blending amount (Y1:% by weight) of dextran or the like contained in the treatment agent fulfills, for example, X1/Y1=0.2 to 6.0, and preferably X1/Y1=0.3 to 0.6. When the ratio X1/Y1 is within this range, it is possible to obtain the water-based ink set in which the optical density (OD value) is higher.

In the water-based ink set of this embodiment, when the phosphate group-modified self-dispersible pigment contained in the water-based ink is self-dispersible carbon black modified with phosphate group, then the ratio preferably fulfills X1/Y1=0.3 to 6.0, and more preferably X1/Y1=0.3 to 0.6. Accordingly, it is possible to obtain the water-based ink set in which the optical density (OD value) is more improved.

In the water-based ink set of this embodiment, when the phosphate group-modified self-dispersible pigment contained in the water-based ink is self-dispersible C. I. Pigment Red 122 modified with phosphate group, then the ratio is preferably X1/Y1=0.2 to 0.4. Accordingly, it is possible to obtain the water-based ink set in which the chromaticness is more improved.

When the water-based ink set is considered as a combination of the water-based black ink, the water-based color ink, and the treatment agent, it is especially preferable to construct the water-based ink set such that self-dispersible carbon black modified with the phosphate group is selected as the colorant of the water-based black ink and self-dispersible C. I. Pigment Red 122 modified with the phosphate group is selected as the colorant of the water-based magenta ink which is the color ink. However, it is possible to obtain the water-based ink set in which the image quality is improved as compared with the conventional technique, by merely using the phosphate group-modified self-dispersible pigment as the colorant of any one of the black and magenta water-based inks.

The treatment agent may further contain water. It is preferable that the water is ion exchange water or pure water. The blending amount of water with respect to the total amount of the treatment agent is not specifically limited. Alternatively, for example, the following form is also available. That is, water is contained as the balance of the other components, and the treatment agent can be used as a treatment solution capable of being discharged from an ink-jet head of an ink-jet recording apparatus.

The treatment agent may further contain a water-soluble organic solvent. Those having been hitherto known can be used as the water-soluble organic solvent. The water-soluble organic solvent is exemplified, for example, by polyhydric alcohol, polyhydric alcohol derivative, alcohol, amide, ketone, ketoalcohol (ketone alcohol), ether, nitrogen-containing solvent, sulfur-containing solvent, propylene carbonate, ethylene carbonate, and 1,3-dimethyl-2-imidazolidinone. The polyhydric alcohol is exemplified, for example, by glycerol, ethylene glycol, diethylene glycol, propylene glycol, butylene glycol, hexylene glycol, triethylene glycol, polyethylene glycol, dipropylene glycol, tripropylene glycol, polypropylene glycol, trimethylolpropane, 1,5-pentanediol, and 1,2,6-hexanetriol. The polyhydric alcohol derivative is exemplified, for example, by ethylene glycol methyl ether, ethylene glycol ethyl ether, ethylene glycol n-propyl ether, ethylene glycol n-butyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. The alcohol is exemplified, for example, by methyl alcohol, ethyl alcohol, n-propyl alcohol, isopropyl alcohol, n-butyl alcohol, sec-butyl alcohol, isobutyl alcohol, tert-butyl alcohol, and benzyl alcohol. The amide is exemplified, for example, by dimethylformamide and dimethylacetoamide. The ketone is exemplified, for example, by acetone. The ketoalcohol is exemplified, for example, by diacetone alcohol. The ether is exemplified, for example, by tetrahydrofuran and dioxane. The nitrogen-containing solvent is exemplified, for example, by pyrrolidone, 2-pyrrolidone, N-methyl-2-pyrrolidone, cyclohexylpyrrolidone, and triethanolamine. The sulfur-containing solvent is exemplified, for example, by thiodiethanol, thiodiglycol, thiodiglycerol, sulforan, and dimethylsulfoxide. The blending amount of the water-soluble organic solvent with respect to the total amount of the treatment agent is not specifically limited. One type of the water-soluble organic solvent may be used singly, or two or more types of the water-soluble organic solvents may be used in combination.

It is preferable that the treatment agent does not contain any colorant. However, it is also allowable that the treatment agent contains any colorant. When the treatment agent contains the colorant, it is preferable that the colorant is contained in an amount of such an extent that the recorded image is not affected thereby. When the treatment agent contains the colorant, the blending amount of the colorant in the treatment agent is, for example, preferably not more than 0.02% by weight, more preferably not more than 0.01% by weight, and much more preferably not more than 0.005% by weight.

The treatment agent may further contain a conventionally known additive, if necessary. The additive is exemplified, for example, by surfactant, pH-adjusting agent, viscosity-adjusting agent, surface tension-adjusting agent, antioxidizing agent, and fungicide. The viscosity-adjusting agent is exemplified, for example, by polyvinyl alcohol, cellulose, and water-soluble resin.

As for the water-based ink set of this embodiment, when the treatment agent is applied to the recording medium prior to the water-based ink, it is preferable that the treatment agent has the low permeability, while the treatment agent does not contain any surfactant and any solvent which is included in the water-soluble organic solvent described above and which enhances the permeability, or the treatment agent has a small blending amount thereof. Accordingly, the treatment agent is easily brought in contact with the water-based ink which is applied to the recording medium thereafter. It is possible to obtain the water-based ink set in which the optical density (OD value) and the chromaticness are more improved. The surface tension of the treatment agent is, for example, 20 mN/m to 60 mN/m, preferably 25 mN/m to 55 mN/m, and more preferably 30 mN/m to 50 mN/m.

The treatment agent described above can be prepared, for example, such that dextran or the like and optionally other additive components are mixed uniformly or homogeneously in accordance with any conventionally known method.

The viscosity of the treatment agent explained above is not specifically limited. The viscosity can be appropriately adjusted depending on the method for applying the treatment agent to the recording medium. When the treatment agent is applied to the recording medium by an ink-jet head, the treatment agent can be a liquid having a viscosity capable of being discharged by the ink-jet head. When the treatment agent is applied to the recording medium by any mechanism other than the ink-jet head, for example, when the treatment agent is applied by means of the stamp application, the brush application, or the roller application, then it is also allowable to use a liquid in which the viscosity of the treatment agent is a high viscosity to such an extent that the ink-jet discharge cannot be performed, provided that the treatment agent can be applied to the recording medium. Alternatively, the treatment agent may be in a gel form.

The water-based ink set of this embodiment can be also provided as cartridges. For example, the cartridge of this embodiment may be provided as a cartridge set including a treatment agent cartridge which is provided with a treatment agent accommodating section for accommodating the treatment agent to construct the water-based ink set of this embodiment, and ink cartridges which are provided with ink cartridges for respective colors each having an ink accommodating section for accommodating the water-based ink to construct the water-based ink set of this embodiment. Alternatively, the cartridge of this embodiment may be an integrated type cartridge in which the interior is comparted to form a treatment agent accommodating section and ink accommodating sections, the treatment agent for constructing the water-based ink set of this embodiment is accommodated in the treatment agent accommodating section, and the water-based ink for constructing the water-based ink set of this embodiment is accommodated in the ink accommodating section. Any conventionally known main body can be used as the main body of the cartridge of this embodiment.

According to this embodiment, it is possible to provide the treatment agent which is usable for the water-based ink set and which has the feature to contain dextran or the like. Furthermore, according to this embodiment, it is possible to provide the cartridge including the treatment agent.

Next, the recording method and the ink-jet recording apparatus of this embodiment will be explained.

The recording method of this embodiment resides in a recording method for performing recording by using a water-based ink set for ink-jet recording including a water-based ink for ink-jet recording and a treatment agent, the method including a treatment agent applying step of applying the treatment agent to the recording medium, and a discharge step of discharging the water-based ink in accordance with an ink-jet system onto the recording medium to which the treatment agent is applied in the treatment agent applying step, wherein the water-based ink set for ink-jet recording of this embodiment is used as the water-based ink set.

The ink-jet recording apparatus of this embodiment resides in an ink-jet recording apparatus including an ink set accommodating section, a treatment agent applying mechanism, and an ink discharge mechanism, wherein the water-based ink for ink-jet recording of this embodiment is accommodated in the ink set accommodating section, the treatment agent for constructing the water-based ink set is applied to a recording medium by the treatment agent applying mechanism, and the water-based ink for constructing the water-based ink set is discharged onto the recording medium by the ink discharge mechanism.

The ink-jet recording method of this embodiment can be carried out, for example, by using the ink-jet recording apparatus of this embodiment. The recording includes, for example, the letter (character) printing, the image printing, and the printing (print or presswork).

Figure 2:
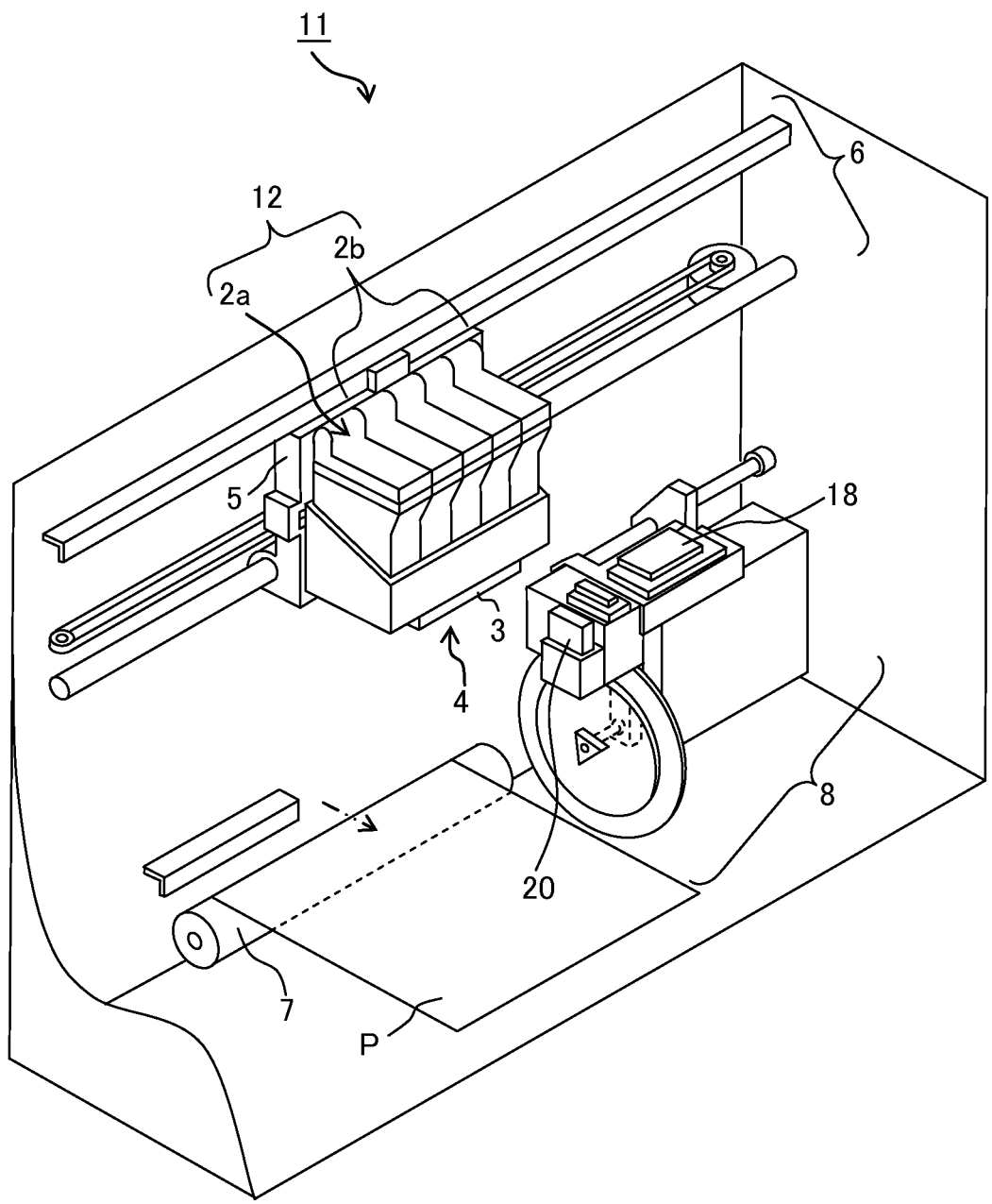
FIG. 2 shows a schematic perspective view illustrating an exemplary arrangement of an ink-jet recording apparatus according to a second embodiment.

FIG. 2 shows an exemplary construction of the ink-jet recording apparatus of this embodiment. The ink-jet recording apparatus of this example is a serial type ink-jet recording apparatus in which a serial type ink-jet head is adopted. As shown in FIG. 2, the serial type ink-jet recording apparatus 11 includes, as main constitutive components, a cartridge assembly 12, an ink discharge mechanism (serial type ink-jet head) 3, a head unit 4, a carriage 5, a driving unit 6, a platen roller 7, and a purge apparatus 8.

The cartridge assembly 12 includes a treatment agent cartridge 2a and four ink cartridges 2b. The treatment agent cartridge 2a contains the treatment agent of this embodiment. Each of the four ink cartridges 2b contains one color of each of four colors of water-based inks of yellow, magenta, cyan, and black. At least one of the four color water-based inks is the water-based ink of this embodiment.

The ink-jet recording apparatus 11 of this embodiment is constructed in the same manner as the ink-jet recording apparatus 1 of the first embodiment shown in FIG. 1 except that the cartridge assembly 12 is provided in place of the ink cartridges 2. The portions of the ink-jet recording apparatus 11 shown in FIG. 2, which are the same as or equivalent to those of the ink-jet recording apparatus 1 of the first embodiment shown in FIG. 1, are designated by the same reference numerals, any explanation of which will be omitted.

Figure 3A:
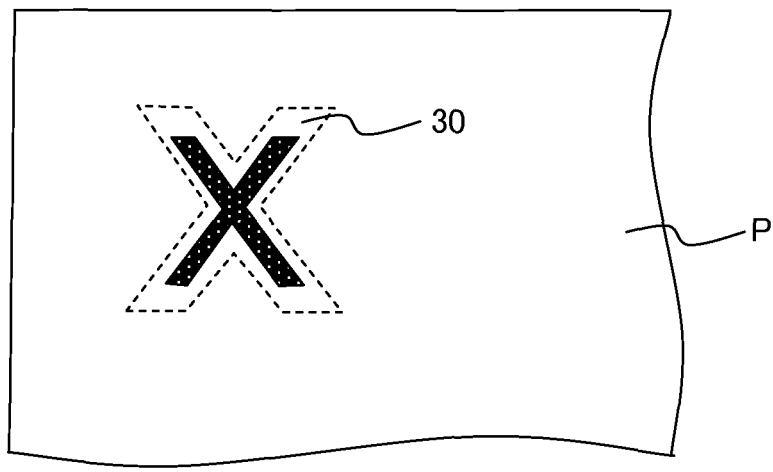
FIGS. 3A and 3B show examples of recording based on an ink-jet recording method according to the second embodiment.
Figure 3B:
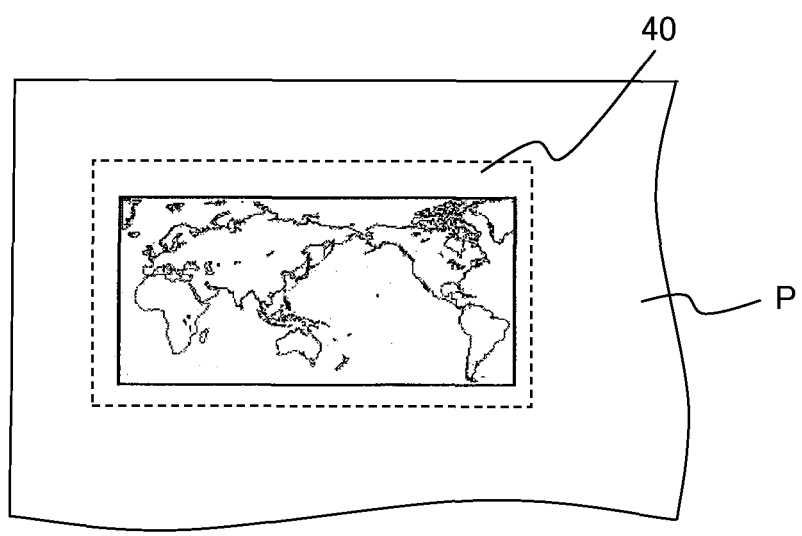

The recording, which is based on the use of the serial type ink-jet recording apparatus 11, is carried out, for example, as follows. At first, the treatment agent of this embodiment is applied (discharged) onto the recording paper P from the serial type ink-jet head 3. The treatment agent may be applied to either the entire surface of the recording surface of the recording paper P or a part thereof. When the treatment agent is applied to the part, at least the recording portion, which is subjected to the recording with the water-based ink on the recording surface of the recording paper P, is the application portion. When the treatment agent is applied to the part, it is preferable that the size of the application portion is larger than the recording portion. For example, as shown in FIG. 3A, when a letter (X) is recorded on the recording paper P, it is preferable to apply the treatment agent so that the application portion 30 is formed to provide a line width which is larger than the line width of the letter. Furthermore, as shown in FIG. 3B, when a pattern is recorded on the recording paper P, it is preferable to apply the treatment agent so that the application portion 40, which is larger than the pattern, is formed.

Subsequently, the water-based ink is discharged from the serial type ink-jet head 3 to the application portion of the recording paper P for applying the treatment agent thereto. Accordingly, the treatment agent and the water-based ink are brought in contact with each other on the recording paper P, and thus it is possible to obtain the recorded matter which is excellent in the optical density (OD value) and the chromaticness. The time, which ranges from the discharge of the treatment agent to the discharge of the water-based ink, is not specifically limited. For example, it is appropriate that the discharge of the water-based ink is carried out within the same scanning as that for the discharge of the treatment agent.

In this example, the treatment agent is used as the pretreatment agent which is applied to the recording paper P prior to the discharge of the water-based ink. However, this embodiment is not limited thereto. In this embodiment, the treatment agent may be applied after the water-based ink is previously discharged to the recording paper P. Alternatively, the application of the treatment agent to the recording paper P and the discharge of the water-based ink may be performed simultaneously.

In the serial type ink-jet recording apparatus 11 of this embodiment, the ink discharge mechanism (serial type ink-jet head) 3 also serves as the treatment agent applying mechanism. However, this embodiment is not limited thereto. In this embodiment, the application of the treatment agent may be carried out in accordance with any system including, for example, the stamp application, the brush application, and the roller application.

The recording paper P, which is subjected to the recording as described above, is discharged from the serial type ink-jet recording apparatus 11. In FIG. 2, the paper feeding mechanism and the paper discharge mechanism for the recording paper P are omitted from the illustration.

In the apparatus shown in FIG. 2, the serial type ink-jet head is adopted. However, this embodiment is not limited thereto. The ink-jet recording apparatus may be an apparatus which adopts a line type ink-jet head.

In the water-based ink set for ink-jet recording of this embodiment, the treatment agent, which contains at least one of dextran and the derivative thereof, is combined with the water-based ink containing the self-dispersible pigment modified with the phosphate group. Accordingly, it is possible to further improve the optical density (OD value) and the chromaticness.

EXAMPLES

Next, Examples of the water-based ink of the present teaching will be explained together with Comparative Examples. The present teaching is not limited to and restricted by Examples and Comparative Examples described below.

Examples 1-1 to 1-13 and Comparative Examples 1-1 to 1-7

Ink solvents were obtained by uniformly mixing components except for the self-dispersible carbon black contained in water-based black-based ink compositions (Table 1). Subsequently, the ink solvents were added to self-dispersible carbon black dispersed in water, followed by being uniformly mixed. After that, obtained mixtures were filtrated through a cellulose acetate type membrane filter produced by Toyo Roshi Kaisha, Ltd. (pore size: 3.00 μm), and thus water-based black-based inks for ink-jet recording of Examples 1-1 to 1-13 and Comparative Examples 1-1 to 1-7 were obtained.

In relation to the water-based black-based inks of Examples and Comparative Examples, (a) the evaluation of the optical density (OD value), (b) the evaluation of the storage stability, and (c) the overall evaluation were carried out in accordance with the following methods.

(a) Evaluation of Optical Density (OD Value)

An image including a black single color patch was recorded on regular paper at a resolution of 600 dpi×300 dpi with each of the water-based black-based inks of Examples and Comparative Examples by using an ink-jet printer DCP-J525N produced by Brother Industries, Ltd, and evaluation samples were prepared. Optical densities (OD values) were measured at five positions in the evaluation sample by using a spectrophotometer (spectrophotometric colorimetry meter) SpectroEye produced by X-Rite, and an average value was determined. The evaluation was performed in accordance with the following evaluation criteria. Recycled Supreme produced by XEROX was used for the regular paper.

Evaluation Criteria for Evaluation of Optical Density (OD Value)

A: The optical density (OD value) was not less than 1.23 times the optical density (OD value) of Comparative Example which was included in Comparative Examples 1-5 to 1-7 and which was under the same condition except that dextran or the like was not blended.

B: The optical density (OD value) was above 1.19 times and less than 1.23 times the optical density (OD value) of Comparative Example which was included in Comparative Examples 1-5 to 1-7 and which was under the same condition except that dextran or the like was not blended.

C: The optical density (OD value) was not more than 1.19 times the optical density (OD value) of Comparative Example which was included in Comparative Examples 1-5 to 1-7 and which was under the same condition except that dextran or the like was not blended.

(b) Evaluation of Storage Stability

The water-based black-based inks of Examples and Comparative Examples were introduced into hermetically sealed containers, followed by being stored for 1 day in an environment of temperature of 40° C. Observation was performed with a microscope (magnification: ×200) to investigate whether or not any aggregate is absent in the evaluation sample prepared as described above. The storage stability was evaluated in accordance with the following evaluation criteria.

<Evaluation Criteria for Evaluation of Storage Stability>

A: Any aggregate was absent.
B: A trace amount of aggregate was observed.
C: A large amount of aggregate was observed.

(c) Overall Evaluation

The overall evaluation was performed in accordance with the following evaluation criteria from the results of (a) and (b) described above for each of the water-based black-based inks.

<Evaluation Criteria for Overall Evaluation>

G: All of the evaluation results of (a) and (b) were not C.
NG: Any one of or both of the evaluation results of (a) and (b) was/were C.

Table 1 shows the water-based black-based ink compositions and the evaluation results of the water-based black-based inks of Examples and Comparative Examples.

TABLE 1

|  |  |  | Example | | | | | | |
|---|---|---|---|---|---|---|---|---|---|
|  |  |  | 1-1 | 1-2 | 1-3 | 1-4 | 1-5 | 1-6 | 1-7 |
| Water-based black-based ink composition (% by weight) | (X) | Self-dispersible carbon black modified with phosphate group (*1) | 7.0 | 7.0 | 7.0 | 7.0 | 7.0 | 7.0 | 7.0 |
|  |  | CAB-O-JET (trade name) 200 (*2) | — | — | — | — | — | — | — |
|  |  | Glycerol | 33.0 | 33.0 | 33.0 | 33.0 | 33.0 | 33.0 | 31.0 |
|  |  | Triethylene glycol | — | — | — | — | — | — | 2.0 |
|  |  | 1,2-Hexanediol | — | — | — | — | — | — | — |
|  |  | Triethylene glycol n-butyl ether | — | — | — | — | — | — | — |
|  | (Y) | Carboxymethyl dextran (*3) | 1.00 | 0.50 | — | — | — | — | 1.00 |
|  |  | Dextran 40000 (*4) | — | — | 1.00 | — | — | — | — |
|  |  | Dextran 60000 (*5) | — | — | — | 1.00 | — | — | — |
|  |  | Dextran 150000 (*6) | — | — | — | — | 1.00 | — | — |
|  |  | Dextran 200000 (*7) | — | — | — | — | — | 1.00 | — |

TABLE 1-continued

|  |  | | | | | | | |
|---|---|---|---|---|---|---|---|---|
| | Starch | — | — | — | — | — | — | — |
| | Olfine (trade name) E1010 (*8) | 0.25 | 0.25 | 0.25 | 0.25 | 0.25 | 0.25 | 0.25 |
| | Water | balance | balance | balance | balance | balance | balance | balance |
| Y/X | | 0.14 | 0.07 | 0.14 | 0.14 | 0.14 | 0.14 | 0.14 |
| Optical density (OD value) | | 1.53 | 1.55 | 1.48 | 1.45 | 1.43 | 1.42 | 1.53 |
| Relative ratio (if Comp. Ex. 1-5 is assumed as 1) | | 1.33 | 1.35 | 1.29 | 1.26 | 1.24 | 1.23 | 1.33 |
| Relative ratio (if Comp. Ex. 1-6 is assumed as 1) | | — | — | — | — | — | — | — |
| Relative ratio (if Comp. Ex. 1-7 is assumed as 1) | | — | — | — | — | — | — | — |
| Evaluation of optical density | | A | A | A | A | A | A | A |
| Evaluation of storage stability | | A | A | A | A | A | A | A |
| Overall evaluation | | G | G | G | G | G | G | G |

|  |  | Example | | | | | |
|---|---|---|---|---|---|---|---|
| | | 1-8 | 1-9 | 1-10 | 1-11 | 1-12 | 1-13 |
| Water-based black-based ink composition (% by weight) | (X) Self-dispersible carbon black modified with phosphate group (*1) | 7.0 | 7.0 | 7.0 | 7.0 | 4.0 | 4.0 |
| | CAB-O-JET (trade name) 200 (*2) | — | — | — | — | — | — |
| | Glycerol | 31.0 | 32.0 | 33.0 | 33.0 | 33.0 | 33.0 |
| | Triethylene glycol | — | — | — | — | — | — |
| | 1,2-Hexanediol | 2.0 | — | — | — | — | — |
| | Triethylene glycol n-butyl ether | — | 0.5 | — | — | — | — |
| | (Y) Carboxymethyl dextran (*3) | 1.00 | 1.00 | 0.20 | 0.30 | 5.00 | 8.00 |
| | Dextran 40000 (*4) | — | — | — | — | — | — |
| | Dextran 60000 (*5) | — | — | — | — | — | — |
| | Dextran 150000 (*6) | — | — | — | — | — | — |
| | Dextran 200000 (*7) | — | — | — | — | — | — |
| | Starch | — | — | — | — | — | — |
| | Olfine (trade name) E1010 (*8) | 0.25 | 0.25 | 0.25 | 0.25 | 0.25 | 0.25 |
| | Water | balance | balance | balance | balance | balance | balance |
| Y/X | | 0.14 | 0.14 | 0.03 | 0.04 | 1.25 | 2.00 |
| Optical density (OD value) | | 1.54 | 1.52 | 1.38 | 1.45 | 1.34 | 1.35 |
| Relative ratio (if Comp. Ex. 1-5 is assumed as 1) | | 1.33 | 1.32 | 1.20 | 1.26 | — | — |
| Relative ratio (if Comp. Ex. 1-6 is assumed as 1) | | — | — | — | — | — | — |
| Relative ratio (if Comp. Ex. 1-7 is assumed as 1) | | — | — | — | — | 1.26 | 1.27 |
| Evaluation of optical density | | A | A | B | A | A | A |
| Evaluation of storage stability | | A | A | A | A | A | B |
| Overall evaluation | | G | G | G | G | G | G |

|  |  | Comparative Example | | | | | | |
|---|---|---|---|---|---|---|---|---|
| | | 1-1 | 1-2 | 1-3 | 1-4 | 1-5 | 1-6 | 1-7 |
| Water-based black-based ink composition (% by weight) | (X) Self-dispersible carbon black modified with phosphate group (*1) | — | — | — | 7.0 | 7.0 | — | 4.0 |
| | CAB-O-JET (trade name) 200 (*2) | 35.00 (7.0) | 35.00 (7.0) | 35.00 (7.0) | — | — | 35.00 (7.0) | — |
| | Glycerol | 33.0 | 33.0 | 33.0 | 33.0 | 33.0 | 33.0 | 33.0 |
| | Triethylene glycol | — | — | — | — | — | — | — |
| | 1,2-Hexanediol | — | — | — | — | — | — | — |
| | Triethylene glycol n-butyl ether | — | — | — | — | — | — | — |
| | (Y) Carboxymethyl dextran (*3) | 1.00 | — | — | — | — | — | — |
| | Dextran 40000 (*4) | — | 1.00 | — | — | — | — | — |
| | Dextran 60000 (*5) | — | — | — | — | — | — | — |
| | Dextran 150000 (*6) | — | — | 1.00 | — | — | — | — |
| | Dextran 200000 (*7) | — | — | — | — | — | — | — |
| | Starch | — | — | — | 1.00 | — | — | — |
| | Olfine (trade name) E1010 (*8) | 0.25 | 0.25 | 0.25 | 0.25 | 0.25 | 0.25 | 0.25 |
| | Water | balance | balance | balance | balance | balance | balance | balance |
| Y/X | | 0.14 | 0.14 | 0.14 | — | — | — | — |
| Optical density (OD value) | | 1.25 | 1.24 | 1.24 | 1.24 | 1.15 | 1.10 | 1.06 |
| Relative ratio (if Comp. Ex. 1-5 is assumed as 1) | | — | — | — | 1.08 | — | — | — |
| Relative ratio (if Comp. Ex. 1-6 is assumed as 1) | | 1.14 | 1.13 | 1.13 | — | — | — | — |
| Relative ratio (if Comp. Ex. 1-7 is assumed as 1) | | — | — | — | — | — | — | — |
| Evaluation of optical density | | C | C | C | C | — | — | — |
| Evaluation of storage stability | | A | A | A | A | — | — | — |
| Overall evaluation | | NG | NG | NG | NG | — | — | — |

TABLE 1 (following) - LEGEND (*1): Prepared by method described, for example, in US2009/0229489
(*2): Self-dispersible carbon black modified with sulfonic acid group; produced by Cabot Corporation; carbon black concentration = 20% by weight; parenthesized numeral indicates pigment solid content amount
(*3): Produced by Meito Sangyo Co., Ltd.; active ingredient = 100%
(*4): Molecular weight: 40000
(*5): Molecular weight: 60000
(*6): Molecular weight: 150000
(*7): Molecular weight: 200000
(*8): Acetylene glycol-based surfactant (ethylene oxide (10 mol) adduct of diol); produced by Nissin Chemical Industry Co., Ltd.; active ingredient = 100%.

As shown in Table 1, in Examples 1-1 to 1-11, the optical density (OD value) was improved to be not less than 1.20 times that of Comparative Example 1-5 having the same condition except that dextran or the like was not blended. Also in Examples 1-12 and 1-13, the optical density (OD value) was improved to be 1.26 times and 1.27 times that of Comparative Example 1-7 having the same condition except that dextran or the like was not blended. In particular, in Examples 1-1 to 1-9, 1-11, and 1-12 in which the weight ratio (X:Y) between the phosphate group-modified self-dispersible black-based pigment (X) and dextran or the like (Y) was 1:0.04 to 1.25 (Y/X was 0.04 to 1.25) and the blending amount of dextran or the like (Y) was 0.3% by weight to 5% by weight, the optical density (OD value) was greatly improved to be not less than 1.23 times that of Comparative Example having the same condition except that dextran or the like was not blended, and the storage stability was more excellent as well. On the other hand, in Comparative Examples 1-1 to 1-3 in which a self-dispersible black-based pigment modified with sulfonic acid group was used in place of the phosphate group-modified self-dispersible black-based pigment, the optical density (OD value) remained 1.13 times to 1.14 times that of Comparative Example 1-6 having the same condition except that dextran or the like was not blended. Furthermore, in Comparative Example 1-4 in which starch was used in place of dextran or the like, the optical density (OD value) remained 1.08 times that of Comparative Example 1-5 having the same condition except that starch was not used.

As described above, the water-based black-based ink of the present teaching makes it possible to further improve the optical density (OD value). The way of use of the water-based black-based ink of the present teaching is not specifically limited, which can be widely applicable to various types of ink-jet recording.

Examples 2-1 to 2-22 and Comparative Examples 2-1 to 2-9

Ink solvents were obtained by uniformly mixing components except for the self-dispersible magenta pigment contained in water-based ink compositions (Table 2). Subsequently, the ink solvents were added to the self-dispersible magenta pigment dispersed in water, followed by being uniformly mixed. After that, obtained mixtures were filtrated through a cellulose acetate type membrane filter produced by Toyo Roshi Kaisha, Ltd. (pore size: 3.00 µm), and thus water-based inks for ink-jet recording of Examples 2-1 to 2-22 and Comparative Examples 2-1 to 2-9 were obtained.

In relation to the water-based inks of Examples 2-1 to 2-22 and Comparative Examples 2-1 to 2-9, (2-a) the evaluation of the chromaticness, (2-b) the evaluation of the vaporization characteristic, and (2-c) the overall evaluation were carried out in accordance with the following methods.

(2-a) Evaluation of Chromaticness

Each of the water-based inks of Examples 2-1 to 2-22 and Comparative Examples 2-1 to 2-9 was subjected to the coating to an area of about 5 cm (width)×about 10 cm (length) at a ratio of about 20 g/m² by using a bar coater on regular paper, followed by being dried to prepare a sample for evaluation. The chromaticness (C*) of the sample for evaluation was measured by using a spectrophotometer, SpectroEye produced by X-Rite (light source: $D_{50}$, angle of field: 2°, density reference: ANSI T), and the evaluation was performed in accordance with the following evaluation criteria. Two types of paper, i.e., Recycled Supreme and Business 4200 produced by XEROX were used for the regular paper. The chromaticness (C*) was evaluated by using an average value obtained from the two types of paper.

<Evaluation Criteria for Evaluation of Chromaticness>

A: The improvement in the chromaticness (C*) was not less than 5 as compared with the chromaticness (C*) of Comparative Example which was included in Comparative Examples 2-3 to 2-9 and which was under the same condition except that dextran or the like was not blended.

B: The improvement in the chromaticness (C*) was not less than 2 and less than 5 as compared with the chromaticness (C*) of Comparative Example which was included in Comparative Examples 2-3 to 2-9 and which was under the same condition except that dextran or the like was not blended.

C: The improvement in the chromaticness (C*) was less than 2 as compared with the chromaticness (C*) of Comparative Example which was included in Comparative Examples 2-3 to 2-9 and which was under the same condition except that dextran or the like was not blended.

(2-b) Evaluation of Vaporization Characteristic 5 g of the water-based ink of each of Examples 2-1 to 2-22 and Comparative Examples 2-1 to 2-9 was poured into an open bottle (vial) (diameter: 20.2 mm). Subsequently, the open bottles were stored overnight in a thermostatic chamber (oven) at a temperature of 60° C. and a relative humidity of 40%. After the storage, the state of the water-based ink in the open bottle was visually observed, and the vaporization characteristic was evaluated in accordance with the following criteria.

<Evaluation Criteria for Evaluation of Vaporization Characteristic>

A: Neither aggregation nor separation of the pigment was caused.

B: It was confirmed that particles of the pigment were enlarged.

C: Conspicuous aggregation or separation of the pigment was confirmed.

(2-c) Overall Evaluation

The overall evaluation was performed in accordance with the following evaluation criteria from the results of (2-a) and (2-b) described above for each of the water-based inks.

<Evaluation Criteria for Overall Evaluation>

G: All of the evaluation results of (2-a) and (2-b) were not C.

NG: Any one of or both of the evaluation results of (2-a) and (2-b) was/were C.

Table 2 shows the water-based ink compositions and the evaluation results of the water-based inks of Examples 2-1 to 2-22 and Comparative Examples 2-1 to 2-9.

TABLE 2

| | | Example | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| Water-based ink composition | (X) Self-dispersible magenta pigment modified with phosphate group (*1) | 5 | 5 | 5 | 5 | 5 | 5 | 5 | 5 | 5 |
| | CAB-O-JET (trade name) 260M (*2) | — | — | — | — | — | — | — | — | — |

TABLE 2-continued

| (% by weight) | | 2-1 | 2-2 | 2-3 | 2-4 | 2-5 | 2-6 | 2-7 | 2-8 | 2-9 |
|---|---|---|---|---|---|---|---|---|---|---|
| | Glycerol | 29.6 | 29.5 | 29.3 | 29 | 28 | 27.5 | 27 | 29 | 29 |
| | (Y) Dextran 150000 (*3) | — | — | — | — | — | — | — | 1.0 | — |
| | Carboxymethyl dextran (*4) | 0.4 | 0.5 | 0.7 | 1.0 | 2.0 | 2.5 | 3.0 | — | — |
| | Sodium dextran sulfate 5000 (*5) | — | — | — | — | — | — | — | — | 1.0 |
| | Water-soluble starch | — | — | — | — | — | — | — | — | — |
| | Surfynol (trade name) 440 (*6) | 0.2 | 0.2 | 0.2 | 0.2 | 0.2 | 0.2 | 0.2 | 0.2 | 0.2 |
| | Olfine (trade name) E1010 (*7) | — | — | — | — | — | — | — | — | — |
| | Sunnol (trade name) NL1430 (*8) | 0.3 | 0.3 | 0.3 | 0.3 | 0.3 | 0.3 | 0.3 | 0.3 | 0.3 |
| | Triethylene glycol n-butyl ether | — | — | — | — | — | — | — | — | — |
| | Water | balance | balance | balance | balance | balance | balance | balance | balance | balance |
| X/Y | | 12.5 | 10.0 | 7.1 | 5.0 | 2.5 | 2.0 | 1.7 | 5.0 | 5.0 |
| Chromaticness | | 56 | 57 | 59 | 61 | 61 | 62 | 64 | 56 | 57 |
| Improved value from Comp. Ex. 2-3 | | 2 | 3 | 5 | 7 | 7 | 8 | 10 | 2 | 3 |
| Improved value from Comp. Ex. 2-4 | | — | — | — | — | — | — | — | — | — |
| Improved value from Comp. Ex. 2-5 | | — | — | — | — | — | — | — | — | — |
| Improved value from Comp. Ex. 2-6 | | — | — | — | — | — | — | — | — | — |
| Improved value from Comp. Ex. 2-7 | | — | — | — | — | — | — | — | — | — |
| Improved value from Comp. Ex. 2-8 | | — | — | — | — | — | — | — | — | — |
| Improved value from Comp. Ex. 2-9 | | — | — | — | — | — | — | — | — | — |
| Evaluation of chromaticness | | B | B | A | A | A | A | A | B | B |
| Evaluation of vaporization characteristic | | A | A | A | A | A | A | B | A | A |
| Overall evaluation | | G | G | G | G | G | G | G | G | G |

| | | Example | | | | | | | | |
|---|---|---|---|---|---|---|---|---|---|---|
| | | 2-10 | 2-11 | 2-12 | 2-13 | 2-14 | 2-15 | 2-16 | 2-17 | 2-18 |
| Water-based ink composition (% by weight) | (X) Self-dispersible magenta pigment modified with phosphate group (*1) | 5 | 5 | 3 | 4 | 6 | 6.5 | 7 | 4 | 4 |
| | CAB-O-JET (trade name) 260M (*2) | — | — | — | — | — | — | — | — | — |
| | Glycerol | 29 | 29 | 31 | 30 | 28 | 27.5 | 29 | 31 | 29 |
| | (Y) Dextran 150000 (*3) | — | — | — | — | — | — | — | — | — |
| | Carboxymethyl dextran (*4) | 1.0 | 1.0 | 1.0 | 1.0 | 1.0 | 1.0 | 1.0 | 0.5 | 2.0 |
| | Sodium dextran sulfate 5000 (*5) | — | — | — | — | — | — | — | — | — |
| | Water-soluble starch | — | — | — | — | — | — | — | — | — |
| | Surfynol (trade name) 440 (*6) | — | 0.2 | 0.2 | 0.2 | 0.2 | 0.2 | 0.2 | 0.2 | 0.2 |
| | Olfine (trade name) E1010 (*7) | 0.2 | — | — | — | — | — | — | — | — |
| | Sunnol (trade name) NL1430 (*8) | 0.3 | — | 0.3 | 0.3 | 0.3 | 0.3 | 0.3 | 0.3 | 0.3 |
| | Triethylene glycol n-butyl ether | — | 2 | — | — | — | — | — | — | — |
| | Water | balance | balance | balance | balance | balance | balance | balance | balance | balance |
| X/Y | | 5.0 | 5.0 | 3.0 | 4.0 | 6.0 | 6.5 | 7.0 | 8.0 | 2.0 |
| Chromaticness | | 60 | 60 | 55 | 60 | 60 | 61 | 61 | 61 | 60 |
| Improved value from Comp. Ex. 2-3 | | 6 | 6 | — | — | — | — | — | — | — |
| Improved value from Comp. Ex. 2-4 | | — | — | 4 | — | — | — | — | — | — |
| Improved value from Comp. Ex. 2-5 | | — | — | — | 6 | — | — | — | 7 | 6 |
| Improved value from Comp. Ex. 2-6 | | — | — | — | — | 5 | — | — | — | — |
| Improved value from Comp. Ex. 2-7 | | — | — | — | — | — | 5 | — | — | — |
| Improved value from Comp. Ex. 2-8 | | — | — | — | — | — | — | 4 | — | — |
| Improved value from Comp. Ex. 2-9 | | — | — | — | — | — | — | — | — | — |
| Evaluation of chromaticness | | A | A | B | A | A | A | B | A | A |
| Evaluation of vaporization characteristic | | A | A | A | A | A | A | A | A | A |
| Overall evaluation | | G | G | G | G | G | G | G | G | G |

| | | Example | | | |
|---|---|---|---|---|---|
| | | 2-19 | 2-20 | 2-21 | 2-22 |
| Water-based ink composition (% by weight) | (X) Self-dispersible magenta pigment modified with phosphate group (*1) | 6 | 6 | 6.5 | 6.5 |
| | CAB-O-JET (trade name) 260M (*2) | — | — | — | — |
| | Glycerol | 28.2 | 26 | 27.6 | 25.2 |
| | (Y) Dextran 150000 (*3) | — | — | — | — |
| | Carboxymethyl dextran (*4) | 0.8 | 3.0 | 0.9 | 3.3 |
| | Sodium dextran sulfate 5000 (*5) | — | — | — | — |
| | Water-soluble starch | — | — | — | — |
| | Surfynol (trade name) 440 (*6) | 0.2 | 0.2 | 0.2 | 0.2 |
| | Olfine (trade name) E1010 (*7) | — | — | — | — |
| | Sunnol (trade name) NL1430 (*8) | 0.3 | 0.3 | 0.3 | 0.3 |
| | Triethylene glycol n-butyl ether | — | — | — | — |
| | Water | balance | balance | balance | balance |
| X/Y | | 7.5 | 2.0 | 7.2 | 2.0 |
| Chromaticness | | 61 | 61 | 61 | 61 |
| Improved value from Comp. Ex. 2-3 | | — | — | — | — |
| Improved value from Comp. Ex. 2-4 | | — | — | — | — |
| Improved value from Comp. Ex. 2-5 | | — | — | — | — |
| Improved value from Comp. Ex. 2-6 | | 6 | 6 | — | — |
| Improved value from Comp. Ex. 2-7 | | — | — | 5 | 5 |
| Improved value from Comp. Ex. 2-8 | | — | — | — | — |
| Improved value from Comp. Ex. 2-9 | | — | — | — | — |
| Evaluation of chromaticness | | A | A | A | A |

TABLE 2-continued

| | | | | | | | | | |
|---|---|---|---|---|---|---|---|---|---|
| Evaluation of vaporization characteristic | | A | | A | | A | | A | |
| Overall evaluation | | G | | G | | G | | G | |

| | | Comparative Example | | | | | | | | |
|---|---|---|---|---|---|---|---|---|---|---|
| | | 2-1 | 2-2 | 2-3 | 2-4 | 2-5 | 2-6 | 2-7 | 2-8 | 2-9 |
| Water-based ink composition (% by weight) | (X) Self-dispersible magenta pigment modified with phosphate group (*1) | 5 | — | 5 | 3 | 4 | 6 | 6.5 | 7 | — |
| | CAB-O-JET (trade name) 260M (*2) | — | 5 | — | — | — | — | — | — | 5 |
| | Glycerol | 29 | 29 | 30 | 32 | 31 | 29 | 28.5 | 28 | 30 |
| | (Y) Dextran 150000 (*3) | — | — | — | — | — | — | — | — | — |
| | Carboxymethyl dextran (*4) | — | 10 | — | — | — | — | — | — | — |
| | Sodium dextran sulfate 5000 (*5) | — | — | — | — | — | — | — | — | — |
| | Water-soluble starch | 1.0 | — | — | — | — | — | — | — | — |
| | Surfynol (trade name) 440 (*6) | 0.2 | 0.2 | 0.2 | 0.2 | 0.2 | 0.2 | 0.2 | 0.2 | 0.2 |
| | Olfine (trade name) E1010 (*7) | — | — | — | — | — | — | — | — | — |
| | Sunnol (trade name) NL1430 (*8) | 0.3 | 0.3 | 0.3 | 0.3 | 0.3 | 0.3 | 0.3 | 0.3 | 0.3 |
| | Triethylene glycol n-butyl ether | — | — | — | — | — | — | — | — | — |
| | Water | balance | balance | balance | balance | balance | balance | balance | balance | balance |
| X/Y | | 5.0 | 5.0 | — | — | — | — | — | — | — |
| Chromaticness | | 55 | 55 | 54 | 51 | 54 | 55 | 56 | 57 | 54 |
| Improved value from Comp. Ex. 2-3 | | 1 | — | — | — | — | — | — | — | — |
| Improved value from Comp. Ex. 2-4 | | — | — | — | — | — | — | — | — | — |
| Improved value from Comp. Ex. 2-5 | | — | — | — | — | — | — | — | — | — |
| Improved value from Comp. Ex. 2-6 | | — | — | — | — | — | — | — | — | — |
| Improved value from Comp. Ex. 2-7 | | — | — | — | — | — | — | — | — | — |
| Improved value from Comp. Ex. 2-8 | | — | — | — | — | — | — | — | — | — |
| Improved value from Comp. Ex. 2-9 | | — | 1 | — | — | — | — | — | — | — |
| Evaluation of chromaticness | | C | C | — | — | — | — | — | — | — |
| Evaluation of vaporization characteristic | | A | A | A | A | A | A | A | B | A |
| Overall evaluation | | NG | NG | — | — | — | — | — | — | — |

TABLE 2 (following) - LEGEND
(*1): Prepared by method described, for example, in US2009/0229489; numerical values in table indicate pigment solid content amounts
(*2): Self-dispersible magenta pigment modified with sulfonic acid group; produced by Cabot Corporation; numerical values in table indicate pigment solid content amounts
(*3): Molecular weight: 150000
(*4): Molecular weight: 40000
(*5): Molecular weight: 5000
(*6): Acetylene diol (EO 3.5)): produced by Air Products and Chemicals, Inc.
(*7): Acetylene glycol-based surfactant (ethylene oxide (10 mol) adduct of diol); produced by Nissin Chemical Industry Co., Ltd.; active ingredient = 100%
(*8): Sodium polyoxyethylene alkyl (C = 12, 13) ether sulfate (3E.O.); produced by Lion Corporation; active ingredient amount: 28% by weight; numerical values in table indicate active ingredient amounts.

As shown in Table 2, in Examples 2-1 to 2-22, the chromaticness (C*) was improved by not less than 2 as compared with Comparative Example of the same condition except that dextran or the like was not blended. In Examples 2-1 to 2-6, 2-8 to 2-19, and 2-21 in which the blending amount (Y) of dextran or the like was 0.4% by weight to 2.5% by weight, the vaporization characteristic was especially excellent. Furthermore, in Examples 2-4 to 2-6, 2-10, 2-11, 2-13 to 2-15, 2-18, 2-20, and 2-22 in which the weight ratio (X/Y) of the phosphate group-modified self-dispersible magenta pigment (X) to dextran or the like (Y) was 2 to 7, the blending amount (X) of the phosphate group-modified self-dispersible magenta pigment was 4% by weight to 6.5% by weight, and carboxymethyl dextran was used as dextran or the like, the chromaticness (C*) was greatly improved to be not less than 5, and the vaporization characteristic was especially excellent as well, as compared with Comparative Example of the same condition except that dextran or the like was not blended.

On the other hand, in Comparative Example 2-1 in which water-soluble starch was used in place of dextran or the like, the chromaticness (C*) was merely improved by 1 as compared with Comparative Example 2-3 of the same condition except that water-soluble starch was not used. Furthermore, in Comparative Example 2-2 in which a self-dispersible magenta pigment modified with sulfonic acid group was used in place of the phosphate group-modified self-dispersible magenta pigment, the chromaticness (C*) was merely improved by 1 as compared with Comparative Example 2-9 of the same condition except that dextran or the like was not blended.

Examples 3-1 to 3-24 and Comparative Examples 3-1 to 3-9

Ink solvents were obtained by uniformly mixing components except for the self-dispersible cyan pigment contained in water-based ink compositions (Table 3). Subsequently, the ink solvents were added to the self-dispersible cyan pigment dispersed in water, followed by being uniformly mixed. After that, obtained mixtures were filtrated through a cellulose acetate type membrane filter produced by Toyo Roshi Kaisha, Ltd. (pore size: 3.00 μm), and thus water-based inks for inkjet recording of Examples 3-1 to 3-24 and Comparative Examples 3-1 to 3-9 were obtained.

In relation to the water-based inks of Examples 3-1 to 3-24 and Comparative Examples 3-1 to 3-9, (3-a) the evaluation of the chromaticness, (3-b) the evaluation of the vaporization characteristic, and (3-c) the overall evaluation were carried out in accordance with the following methods.

(3-a) Evaluation of Chromaticness

The chromaticness of each of the water-based inks of Examples 3-1 to 3-24 and Comparative Examples 3-1 to 3-9 was measured in the same manner as the water-based inks of Examples 2-1 to 2-22 and Comparative Examples 2-1 to 2-9, and the evaluation was performed in accordance with the following evaluation criteria.

<Evaluation Criteria for Evaluation of Chromaticness>

A: The improvement in the chromaticness (C*) was not less than 4 as compared with the chromaticness (C*) of Comparative Example which was included in Comparative Examples 3-3 to 3-9 and which was under the same condition except that dextran or the like was not blended.

B: The improvement in the chromaticness (C*) was not less than 2 and less than 4 as compared with the chromaticness (C*) of Comparative Example which was included in Comparative Examples 3-3 to 3-9 and which was under the same condition except that dextran or the like was not blended.

C: The improvement in the chromaticness (C*) was less than 2 as compared with the chromaticness (C*) of Comparative Example which was included in Comparative Examples 3-3 to 3-9 and which was under the same condition except that dextran or the like was not blended.

(3-b) Vaporization Characteristic

The vaporization characteristic was evaluated for each of the water-based inks of Examples 3-1 to 3-24 and Comparative Examples 3-1 to 3-9 in the same manner as the water-based inks of Examples 2-1 to 2-22 and Comparative Examples 2-1 to 2-9.

(3-c) Overall Evaluation

The overall evaluation was performed for each of the water-based inks of Examples 3-1 to 3-24 and Comparative Examples 3-1 to 3-9 in the same manner as the water-based inks of Examples 2-1 to 2-22 and Comparative Examples 2-1 to 2-9.

Table 3 shows the water-based ink compositions and the evaluation results of the water-based inks of Examples 3-1 to 3-24 and Comparative Examples 3-1 to 3-9.

TABLE 3

| | | Example | | | | | | | | |
|---|---|---|---|---|---|---|---|---|---|---|
| | | 3-1 | 3-2 | 3-3 | 3-4 | 3-5 | 3-6 | 3-7 | 3-8 | 3-9 |
| Water-based ink composition (% by weight) | (X) Self-dispersible cyan pigment modified with phosphate group (*1) | 4 | 4 | 4 | 4 | 4 | 4 | 4 | 4 | 4 |
| | CAB-O-JET (trade name) 250C (*2) | — | — | — | — | — | — | — | — | — |
| | Glycerol | 30 | 30 | 29 | 29 | 28 | 28.0 | 27 | 29 | 29 |
| | (Y) Dextran 150000 (*3) | — | — | — | — | — | — | — | 2.0 | — |
| | Carboxymethyl dextran (*4) | 1.0 | 1.5 | 2.0 | 2.5 | 3.0 | 3.5 | 4.0 | — | — |
| | Sodium dextran sulfate 5000 (*5) | — | — | — | — | — | — | — | — | 2.0 |
| | Water-soluble starch | — | — | — | — | — | — | — | — | — |
| | Surfynol (trade name) 440 (*6) | 0.2 | 0.2 | 0.2 | 0.2 | 0.2 | 0.2 | 0.2 | 0.2 | 0.2 |
| | Olfine (trade name) E1010 (*7) | — | — | — | — | — | — | — | — | — |
| | Sunnol (trade name) NL1430 (*8) | 0.3 | 0.3 | 0.3 | 0.3 | 0.3 | 0.3 | 0.3 | 0.3 | 0.3 |
| | Triethylene glycol n-butyl ether | — | — | — | — | — | — | — | — | — |
| | Water | balance | balance | balance | balance | balance | balance | balance | balance | balance |
| X/Y | | 4.0 | 2.7 | 2.0 | 1.6 | 1.3 | 1.1 | 1.0 | 2.0 | 2.0 |
| Chromaticness | | 53 | 54 | 55 | 55 | 56 | 55 | 55 | 52 | 53 |
| Improved value from Comp. Ex. 3-3 | | 3 | 4 | 5 | 5 | 6 | 5 | 5 | 3 | 3 |
| Improved value from Comp. Ex. 3-4 | | — | — | — | — | — | — | — | — | — |
| Improved value from Comp. Ex. 3-5 | | — | — | — | — | — | — | — | — | — |
| Improved value from Comp. Ex. 3-6 | | — | — | — | — | — | — | — | — | — |
| Improved value from Comp. Ex. 3-7 | | — | — | — | — | — | — | — | — | — |
| Improved value from Comp. Ex. 3-8 | | — | — | — | — | — | — | — | — | — |
| Improved value from Comp. Ex. 3-9 | | — | — | — | — | — | — | — | — | — |
| Evaluation of chromaticness | | B | A | A | A | A | A | A | B | B |
| Evaluation of vaporization characteristic | | A | A | A | A | A | A | A | A | A |
| Overall evaluation | | G | G | G | G | G | G | G | G | G |

| | | Example | | | | | | | | |
|---|---|---|---|---|---|---|---|---|---|---|
| | | 3-10 | 3-11 | 3-12 | 3-13 | 3-14 | 3-15 | 3-16 | 3-17 | 3-18 |
| Water-based ink composition (% by weight) | (X) Self-dispersible cyan pigment modified with phosphate group (*1) | 4 | 4 | 2.5 | 3 | 3.5 | 4.5 | 5 | 2.5 | 2.5 |
| | CAB-O-JET (trade name) 250C (*2) | — | — | — | — | — | — | — | — | — |
| | Glycerol | 30 | 29 | 31 | 31 | 30 | 29 | 29 | 32 | 30 |
| | (Y) Dextran 150000 (*3) | — | — | — | — | — | — | — | — | — |
| | Carboxymethyl dextran (*4) | 1.5 | 1.5 | 1.5 | 1.5 | 1.5 | 1.5 | 1.5 | 0.9 | 2.5 |
| | Sodium dextran sulfate 5000 (*5) | — | — | — | — | — | — | — | — | — |
| | Water-soluble starch | — | — | — | — | — | — | — | — | — |
| | Surfynol (trade name) 440 (*6) | — | 0.2 | 0.2 | 0.2 | 0.2 | 0.2 | 0.2 | 0.2 | 0.2 |
| | Olfine (trade name) E1010 (*7) | 0.2 | — | — | — | — | — | — | — | — |
| | Sunnol (trade name) NL1430 (*8) | 0.3 | 0.3 | 0.3 | 0.3 | 0.3 | 0.3 | 0.3 | 0.3 | 0.3 |
| | Triethylene glycol n-butyl ether | — | 2 | — | — | — | — | — | — | — |
| | Water | balance | balance | balance | balance | balance | balance | balance | balance | balance |
| X/Y | | 2.7 | 2.7 | 1.7 | 2.0 | 2.3 | 3.0 | 3.3 | 2.8 | 1.0 |
| Chromaticness | | 54 | 54 | 52 | 53 | 53 | 53 | 53 | 51 | 53 |
| Improved value from Comp. Ex. 3-3 | | 4 | 4 | — | — | — | — | — | — | — |
| Improved value from Comp. Ex. 3-4 | | — | — | 5 | — | — | — | — | 4 | 6 |
| Improved value from Comp. Ex. 3-5 | | — | — | — | 5 | — | — | — | — | — |
| Improved value from Comp. Ex. 3-6 | | — | — | — | — | 5 | — | — | — | — |
| Improved value from Comp. Ex. 3-7 | | — | — | — | — | — | 4 | — | — | — |
| Improved value from Comp. Ex. 3-8 | | — | — | — | — | — | — | 4 | — | — |
| Improved value from Comp. Ex. 3-9 | | — | — | — | — | — | — | — | — | — |
| Evaluation of chromaticness | | A | A | A | A | A | A | A | A | A |
| Evaluation of vaporization characteristic | | A | A | A | A | A | A | A | A | A |
| Overall evaluation | | G | G | G | G | G | G | G | G | G |

TABLE 3-continued

|  |  | Example |  |  |  |  |  |
|---|---|---|---|---|---|---|---|
|  |  | 3-19 | 3-20 | 3-21 | 3-22 | 3-23 | 3-24 |
| Water-based ink composition (% by weight) | (X) Self-dispersible cyan pigment modified with phosphate group (*1) | 3.5 | 3.5 | 4.5 | 4.5 | 5 | 5 |
|  | CAB-O-JET (trade name) 250C (*2) | — | — | — | — | — | — |
|  | Glycerol | 30.2 | 28 | 29 | 26 | 28.5 | 25 |
|  | (Y) Dextran 150000 (*3) | — | — | — | — | — | — |
|  | Carboxymethyl dextran (*4) | 1.3 | 3.5 | 1.5 | 4.5 | 1.5 | 5.0 |
|  | Sodium dextran sulfate 5000 (*5) | — | — | — | — | — | — |
|  | Water-soluble starch | — | — | — | — | — | — |
|  | Surfynol (trade name) 440 (*6) | 0.2 | 0.2 | 0.2 | 0.2 | 0.2 | 0.2 |
|  | Olfine (trade name) E1010 (*7) | — | — | — | — | — | — |
|  | Sunnol (trade name) NL1430 (*8) | 0.3 | 0.3 | 0.3 | 0.3 | 0.3 | 0.3 |
|  | Triethylene glycol n-butyl ether | — | — | — | — | — | — |
|  | Water | balance | balance | balance | balance | balance | balance |
| X/Y |  | 2.7 | 1.0 | 3.0 | 1.0 | 3.3 | 1.0 |
| Chromaticness |  | 52 | 55 | 53 | 55 | 54 | 54 |
| Improved value from Comp. Ex. 3-3 |  | — | — | — | — | — | — |
| Improved value from Comp. Ex. 3-4 |  | — | — | — | — | — | — |
| Improved value from Comp. Ex. 3-5 |  | — | — | — | — | — | — |
| Improved value from Comp. Ex. 3-6 |  | 4 | 7 | — | — | — | — |
| Improved value from Comp. Ex. 3-7 |  | — | — | 4 | 6 | — | — |
| Improved value from Comp. Ex. 3-8 |  | — | — | — | — | 5 | 5 |
| Improved value from Comp. Ex. 3-9 |  | — | — | — | — | — | — |
| Evaluation of chromaticness |  | A | A | A | A | A | A |
| Evaluation of vaporization characteristic |  | A | A | A | A | A | B |
| Overall evaluation |  | G | G | G | G | G | G |

|  |  | Comparative Example |  |  |  |  |  |  |  |  |
|---|---|---|---|---|---|---|---|---|---|---|
|  |  | 3-1 | 3-2 | 3-3 | 3-4 | 3-5 | 3-6 | 3-7 | 3-8 | 3-9 |
| Water-based ink composition (% by weight) | (X) Self-dispersible cyan pigment modified with phosphate group (*1) | 4 | — | 4 | 2.5 | 3 | 3.5 | 4.5 | 5 | — |
|  | CAB-O-JET (trade name) 250C (*2) | — | 4 | — | — | — | — | — | — | 4 |
|  | Glycerol | 31 | 30 | 31 | 33 | 32 | 32 | 31 | 30 | 31 |
|  | (Y) Dextran 150000 (*3) | — | — | — | — | — | — | — | — | — |
|  | Carboxymethyl dextran (*4) | — | 1.0 | — | — | — | — | — | — | — |
|  | Sodium dextran sulfate 5000 (*5) | — | — | — | — | — | — | — | — | — |
|  | Water-soluble starch | 1.0 | — | — | — | — | — | — | — | — |
|  | Surfynol (trade name) 440 (*6) | 0.2 | 0.2 | 0.2 | 0.2 | 0.2 | 0.2 | 0.2 | 0.2 | 0.2 |
|  | Olfine (trade name) E1010 (*7) | — | — | — | — | — | — | — | — | — |
|  | Sunnol (trade name) NL1430 (*8) | 0.3 | 0.3 | 0.3 | 0.3 | 0.3 | 0.3 | 0.3 | 0.3 | 0.3 |
|  | Triethylene glycol n-butyl ether | — | — | — | — | — | — | — | — | — |
|  | Water | balance | balance | balance | balance | balance | balance | balance | balance | balance |
| X/Y |  | 4.0 | 4.0 | — | — | — | — | — | — | — |
| Chromaticness |  | 50 | 48 | 50 | 47 | 48 | 48 | 49 | 49 | 47 |
| Improved value from Comp. Ex. 3-3 |  | 0 | — | — | — | — | — | — | — | — |
| Improved value from Comp. Ex. 3-4 |  | — | — | — | — | — | — | — | — | — |
| Improved value from Comp. Ex. 3-5 |  | — | — | — | — | — | — | — | — | — |
| Improved value from Comp. Ex. 3-6 |  | — | — | — | — | — | — | — | — | — |
| Improved value from Comp. Ex. 3-7 |  | — | — | — | — | — | — | — | — | — |
| Improved value from Comp. Ex. 3-8 |  | — | — | — | — | — | — | — | — | — |
| Improved value from Comp. Ex. 3-9 |  | — | 1 | — | — | — | — | — | — | — |
| Evaluation of chromaticness |  | C | C | — | — | — | — | — | — | — |
| Evaluation of vaporization characteristic |  | A | A | — | A | A | A | A | A | A |
| Overall evaluation |  | NG | NG | — | — | — | — | — | — | — |

TABLE 3 (following) - LEGEND (*1): Prepared by method described, for example, in US2009/0229489; numerical values in table indicate pigment solid content amounts
(*2): Self-dispersible cyan pigment modified with sulfonic acid group; produced by Cabot Corporation; numerical values in table indicate pigment solid content amounts
(*3): Molecular weight: 150000
(*4): Molecular weight: 40000
(*5): Molecular weight: 5000
(*6): Acetylene diol (EO 3.5)); produced by Air Products and Chemicals, Inc.
(*7): Acetylene glycol-based surfactant (ethylene oxide (10 mol) adduct of diol); produced by Nissin Chemical Industry Co., Ltd.; active ingredient = 100%
(*8): Sodium polyoxyethylene alkyl (C = 12, 13) ether sulfate (3E.O.); produced by Lion Corporation; active ingredient amount: 28% by weight; numerical values in table indicate active ingredient amounts.

As shown in Table 3, in Examples 3-1 to 3-24, the chromaticness (C*) was improved by not less than 2 as compared with Comparative Example of the same condition except that dextran or the like was not blended. In Examples 3-1 to 3-23 in which the blending amount (Y) of dextran or the like was 1% by weight to 4.5% by weight, the vaporization characteristic was especially excellent. Furthermore, in Examples 3-2 to 3-7, 3-10 to 3-14, 3-18 to 3-20, and 3-22 in which the weight ratio (X/Y) of the phosphate group-modified self-dispersible cyan pigment (X) to dextran or the like (Y) was 1 to 2.7, the blending amount (X) of the phosphate group-modified self-dispersible cyan pigment was 2.5% by weight to 4.5% by weight, and carboxymethyl dextran was used as dextran or the like, the chromaticness (C*) was greatly improved to be not less than 4, and the vaporization characteristic was especially excellent as well, as compared with Comparative Example of the same condition except that dextran or the like was not blended.

On the other hand, in Comparative Example 3-1 in which water-soluble starch was used in place of dextran or the like, the chromaticness (C*) was the same as that of Comparative Example 3-3 of the same condition except that water-soluble starch was not used. Furthermore, in Comparative Example 3-2 in which a self-dispersible cyan pigment modified with sulfonic acid group was used in place of the phosphate group-modified self-dispersible cyan pigment, the chromaticness (C*) was merely improved by 1 as compared with Comparative Example 3-9 of the same condition except that dextran or the like was not blended.

As described above, the water-based ink of the present teaching makes it possible to further improve the chromaticness. The way of use of the water-based ink of the present teaching is not specifically limited, which can be widely applicable to various types of ink-jet recording.

Next, Examples of the water-based ink set of the present teaching will be explained together with Comparative Examples. The present teaching is not limited to and restricted by Examples and Comparative Examples described below.

<Preparation of Water-Based Ink>

Ink solvents were obtained by uniformly mixing components except for the water dispersion of the self-dispersible pigment contained in water-based ink compositions (Table 4). Subsequently, the ink solvents were added to the water dispersion of the self-dispersible pigment, followed by being uniformly mixed. After that, obtained mixtures were filtrated through a cellulose acetate type membrane filter produced by Toyo Roshi Kaisha, Ltd. (pore size: 3.00 μm), and thus a water-based black ink for ink-jet recording A and a water-based magenta ink for ink-jet recording B were obtained.

<Preparation of Treatment Agent>

Respective components of treatment agent compositions (Table 5) were uniformly mixed, and treatment agents 1 to 9 were obtained.

TABLE 4

|  |  | Water-based ink (% by weight) | |
|---|---|---|---|
|  |  | A | B |
| (X1) | Water dispersion of self-dispersible carbon black modified with phosphate group (*1) | 40.0 (6.0) | — |
|  | Water dispersion of self-dispersible C.I. Pigment Red 122 modified with phosphate group (*2) | — | 25.7 (4.0) |
| Glycerol | | 20.0 | 23.0 |
| Triethylene glycol n-butyl ether | | 2.0 | 2.0 |
| Olfine (trade name) E1010 (*3) | | 0.2 | 0.2 |
| Water | | balance | balance |

TABLE 4 (following) - LEGEND
(*1): Prepared by method described, for example, in US2009/0229489; carbon black concentration = 15% by weight; parenthesized numeral indicates pigment solid content amount
(*2): Prepared by method described, for example, in US2009/0229489; C.I. Pigment Red 122 concentration = 15% by weight; parenthesized numeral indicates pigment solid content amount
(*3): Acetylene glycol-based surfactant (ethylene oxide (10 mol) adduct of diol); produced by Nissin Chemical Industry Co., Ltd.; active ingredient = 100% (unit of blending amount: % by weight)

TABLE 5

|  |  | Treatment agent (% by weight) | | | | |
|---|---|---|---|---|---|---|
|  |  | 1 | 2 | 3 | 4 | 5 |
| (Y1) | CMD-L (*4) | 0.1 | 1 | 5 | 10 | 18 |
|  | CMD-D40(*5) | — | — | — | — | — |
|  | CMD-500(*6) | — | — | — | — | — |
| Starch |  | — | — | — | — | — |
| Water |  | balance | balance | balance | balance | balance |

|  |  | Treatment agent (% by weight) | | | |
|---|---|---|---|---|---|
|  |  | 6 | 7 | 8 | 9 |
| (Y1) | CMD-L (*4) | — | — | — | — |
|  | CMD-D40(*5) | 10 | — | — | — |
|  | CMD-500(*6) | — | 10 | — | — |
| Starch |  | — | — | 5 | — |
| Water |  | balance | balance | balance | 100 |

TABLE 5 (following) - LEGEND
(*4): Sodium carboxymethyl dextran (molecular weight: about 10,000); produced by Meito Sangyo Co., Ltd.
(*5)Sodium carboxymethyl dextran (molecular weight: about 40,000); produced by Meito Sangyo Co., Ltd.
(*6)Sodium carboxymethyl dextran (molecular weight: about 500,000); produced by Meito Sangyo Co., Ltd.
(unit of blending amount: % by weight)

Examples 4-1 to 4-7 and Comparative Examples 4-1 and 4-2

Water-based ink sets for ink-jet recording were obtained by combining the water-based black ink A and the treatment agents 1-9 as shown in Table 6.

The evaluation of the optical density (OD value) difference (ΔOD) was carried out in accordance with the following method in relation to Examples 4-1 to 4-7 and Comparative Examples 4-1 and 4-2.

An image including a black single color patch was recorded on regular paper at a resolution of 600 dpi×300 dpi by continuously discharging the treatment agent and the water-based black ink for constructing each of the water-based ink sets of Examples 4-1 to 4-7 and Comparative Examples 4-1 and 4-2 by using an ink-jet printer DCP-J525N produced by Brother Industries, Ltd., and evaluation samples were prepared. Optical densities (OD values) were measured at five positions in the evaluation sample by using a spectrophotometer (spectrophotometric colorimetry meter) Spectro-Eye produced by X-Rite, and an average value was determined. Recycled Supreme produced by XEROX was used for the regular paper.

Subsequently, the optical density (OD value) difference (ΔOD) was calculated by subtracting the optical density (OD value) of Comparative Example 4-3 in which the evaluation sample was prepared by using only the water-based black ink A without using the treatment agent, from the optical density (OD value) of each of Examples 4-1 to 4-7 and Comparative Examples 4-1 and 4-2.

Table 6 shows the water-based black ink and the treatment agents for constructing the water-based ink sets of Examples 4-1 to 4-7 and Comparative Examples 4-1 and 4-2 and the evaluation results of the optical density (OD value) difference (ΔOD).

TABLE 6

| | Water-based black ink | Treatment agent | X1/Y1 | Optical density (OD value) | ΔOD |
|---|---|---|---|---|---|
| Ex. 4-1 | A | 1 | 60 | 1.25 | 0.08 |
| Ex. 4-2 | A | 2 | 6 | 1.32 | 0.15 |
| Ex. 4-3 | A | 3 | 1.2 | 1.34 | 0.17 |
| Ex. 4-4 | A | 4 | 0.6 | 1.36 | 0.19 |
| Ex. 4-5 | A | 5 | 0.3 | 1.40 | 0.23 |
| Ex. 4-6 | A | 6 | 0.6 | 1.37 | 0.20 |
| Ex. 4-7 | A | 7 | 0.6 | 1.38 | 0.21 |
| Comp. Ex. 4-1 | A | 8 | — | 1.16 | −0.01 |
| Comp. Ex. 4-2 | A | 9 | — | 1.15 | −0.02 |
| Comp. Ex. 4-3 | A | — | — | 1.17 | — |

As shown in Table 6, the improvement in the optical density (OD value) was observed in Examples 4-1 to 4-7 as compared with Comparative Example 4-3 in which the evaluation sample was prepared by using only the water-based black ink A without using the treatment agent. In particular, the degree of the improvement in the optical density (OD value) was large in Examples 4-2 to 4-7 in which the blending amount of dextran or the like with respect to the total amount of the treatment agent was 1% by weight to 18% by weight. Furthermore, the degree of the improvement in the optical density (OD value) was large in Examples 4-2 to 4-7 in which the ratio of the solid content amount (X1:% by weight) of the phosphate group-modified self-dispersible pigment contained in the water-based ink to the blending amount (Y1:% by weight) of dextran or the like contained in the treatment agent fulfilled X1/Y1=0.3 to 6.0. Moreover, the degree of the improvement in the optical density (OD value) was larger in Examples 4-4 to 4-7 in which the ratio fulfilled X1/Y1=0.3 to 0.6. On the other hand, the optical density (OD value) was lowered in Comparative Examples 4-1 and 4-2 in which the aqueous starch solution or water was used as the treatment agent, as compared with Comparative Example 4-3.

Examples 5-1 to 5-5 and Comparative Examples 5-1 and 5-2

Water-based ink sets for ink-jet recording were obtained by combining the water-based magenta ink B and the treatment agents 3-9 as shown in Table 7.

The evaluation of the chromaticness (C*) difference (ΔC*) was carried out in accordance with the following method in relation to Examples 5-1 to 5-5 and Comparative Examples 5-1 and 5-2.

An image including a magenta single color patch was recorded on regular paper at a resolution of 600 dpi×300 dpi by continuously discharging the treatment agent and the water-based magenta ink for constructing each of the water-based ink sets of Examples 5-1 to 5-5 and Comparative Examples 5-1 and 5-2 by using an ink-jet printer DCP-J525N produced by Brother Industries, Ltd., and evaluation samples were prepared. Chromaticnesses (C*) were measured at five positions in the evaluation sample by using a spectrophotometer (spectrophotometric colorimetry meter) SpectroEye produced by X-Rite, and an average value was determined. Recycled Supreme produced by XEROX was used for the regular paper.

Subsequently, the chromaticness (C*) difference (ΔC*) was calculated by subtracting the chromaticness (C*) of Comparative Example 5-3 in which the evaluation sample was prepared by using only the water-based magenta ink B without using the treatment agent, from the chromaticness (C*) of each of Examples 5-1 to 5-5 and Comparative Examples 5-1 and 5-2.

Table 7 shows the water-based magenta ink and the treatment agents for constructing the water-based ink sets of Examples 5-1 to 5-5 and Comparative Examples 5-1 and 5-2 and the evaluation results of the chromaticness (C*) difference (ΔC*).

TABLE 7

| | Water-based magenta ink | Treatment agent | X1/Y1 | Chromaticness (C*) | ΔC* |
|---|---|---|---|---|---|
| Ex. 5-1 | B | 3 | 0.8 | 57.6 | 0.9 |
| Ex. 5-2 | B | 4 | 0.4 | 60.8 | 4.1 |
| Ex. 5-3 | B | 5 | 0.2 | 60.3 | 3.6 |
| Ex. 5-4 | B | 6 | 0.4 | 61.0 | 4.3 |
| Ex. 5-5 | B | 7 | 0.4 | 61.8 | 5.1 |
| Comp. Ex. 5-1 | B | 8 | — | 55.3 | −1.4 |
| Comp. Ex. 5-2 | B | 9 | — | 54.8 | −1.9 |
| Comp. Ex. 5-3 | B | — | — | 56.7 | — |

As shown in Table 7, the improvement in the chromaticness (C*) was observed in Examples 5-1 to 5-5 as compared with Comparative Example 5-3 in which the evaluation sample was prepared by using only the water-based magenta ink B without using the treatment agent. In particular, the degree of the improvement in the chromaticness (C*) was large in Examples 5-2 to 5-5 in which the blending amount of dextran or the like with respect to the total amount of the treatment agent was 10% by weight to 18% by weight. Furthermore, the degree of the improvement in the optical density (OD value) was large in Examples 5-2 to 5-5 in which the ratio of the solid content amount (X1:% by weight) of the phosphate group-modified self-dispersible pigment contained in the water-based ink to the blending amount (Y1:% by weight) of dextran or the like contained in the treatment agent fulfilled X1/Y1=0.2 to 0.4. On the other hand, the chromaticness (C*) was lowered in Comparative Examples 5-1 and 5-2 in which the aqueous starch solution or water was used as the treatment agent, as compared with Comparative Example 5-3.

As described above, the water-based ink set of the present teaching makes it possible to further improve the optical density (OD value) and the chromaticness. The way of use of the water-based ink set of the present teaching is not specifically limited, which can be widely applicable to various types of recording.

What is claimed is:

1. A water-based ink for ink-jet recording, comprising:
   a self-dispersible pigment modified with phosphate group;
   dextran, a dextran derivative, or both, wherein the dextran, dextran derivative, or both has a carboxyalkyl group; and
   water.

2. The water-based ink for ink-jet recording according to claim 1, wherein the dextran, dextran derivative, or both is a carboxymethyl dextran or a salt thereof.

3. The water-based ink for ink-jet recording according to claim 1, wherein the dextran, dextran derivative, or both has a molecular weight of 10,000 to 40,000.

4. The water-based ink for ink-jet recording according to claim 1, wherein the self-dispersible pigment modified with the phosphate group is a self-dispersible black-based pigment modified with phosphate group.

5. The water-based ink for ink-jet recording according to claim 4, wherein the dextran, dextran derivative, or both is contained by 0.3% by weight to 5% by weight in the water-based ink.

6. The water-based ink for ink-jet recording according to claim 4, wherein a weight ratio (Y/X) of a weight (Y) of the dextran, dextran derivative, or both to a weight (X) of the self-dispersible black-based pigment modified with the phosphate group fulfills 0.04 to 1.25.

7. The water-based ink for ink-jet recording according to claim 1, wherein the self-dispersible pigment modified with the phosphate group is a self-dispersible magenta pigment modified with phosphate group.

8. The water-based ink for ink-jet recording according to claim 7, wherein the dextran, dextran derivative, or both is contained by 0.4% by weight to 3% by weight in the water-based ink.

9. The water-based ink for ink-jet recording according to claim 7, wherein the self-dispersible magenta pigment modified with the phosphate group is contained by 4% by weight to 6.5% by weight in the water-based ink.

10. The water-based ink for ink-jet recording according to claim 7, wherein a weight ratio (X/Y) of a weight (X) of the self-dispersible magenta pigment modified with the phosphate group to a weight (Y) of the dextran, dextran derivative, or both fulfills 2 to 7.

11. The water-based ink for ink-jet recording according to claim 1, wherein the self-dispersible pigment modified with the phosphate group is a self-dispersible cyan pigment modified with phosphate group.

12. The water-based ink for ink-jet recording according to claim 11, wherein the dextran, dextran derivative, or both is contained by 1% by weight to 4% by weight in the water-based ink.

13. The water-based ink for ink-jet recording according to claim 11, wherein a weight ratio (X/Y) of a weight (X) of the self-dispersible cyan pigment modified with the phosphate group to a weight (Y) of the dextran, dextran derivative, or both fulfills 1 to 2.7.

14. A water-based ink set for ink-jet recording, comprising:
a water-based ink for ink-jet recording which contains a self-dispersible pigment modified with phosphate group and water; and
a treatment agent which contains dextran, a dextran derivative, or both.

15. The water-based ink set for ink-jet recording according to claim 14, wherein:
the self-dispersible pigment modified with the phosphate group is self-dispersible carbon black modified with phosphate group; and
the dextran, dextran derivative, or both is contained by 1% by weight to 18% by weight in the treatment agent.

16. The water-based ink set for ink-jet recording according to claim 14, wherein:
the self-dispersible pigment modified with the phosphate group is self-dispersible C. I. Pigment Red 122 modified with phosphate group; and
the dextran, dextran derivative, or both is contained by 10% by weight to 18% by weight in the treatment agent.

17. The water-based ink set for ink-jet recording according to claim 14, wherein the dextran, dextran derivative, or both has carboxyalkyl group.

18. The water-based ink set for ink-jet recording according to claim 14, wherein the dextran, dextran derivative, or both is a carboxymethyl dextran or a salt thereof.

19. The water-based ink set for ink-jet recording according to claim 14, wherein a plurality of the water-based inks for ink-jet recording are a water-based black ink which contains self-dispersible carbon black modified with phosphate group and a water-based magenta ink which contains self-dispersible C. I. Pigment Red 122 modified with phosphate group.

20. The water-based ink set for ink-jet recording according to claim 14, wherein a ratio (X1/Y1) of a solid content amount (X1: % by weight) of the self-dispersible pigment modified with the phosphate group contained in the water-based ink to a blending amount (Y1: % by weight) of the dextran, dextran derivative, or both contained in the treatment agent fulfills 0.2 to 6.0.

21. The water-based ink set for ink-jet recording according to claim 14, wherein:
the self-dispersible pigment modified with the phosphate group is self-dispersible C. I. Pigment Red 122 modified with phosphate group; and
a ratio (X1/Y1) of a solid content amount (X1: % by weight) of the self-dispersible pigment modified with the phosphate group contained in the water-based ink to a blending amount (Y1: % by weight) of the dextran, dextran derivative, or both contained in the treatment agent fulfills 0.2 to 0.4.

22. A treatment agent which is to be used for the water-based ink set for ink-jet recording as defined in claim 14.

23. A water-based ink for ink-jet recording, comprising:
a self-dispersible pigment modified with phosphate group;
dextran, a dextran derivative, or both; and
water,
wherein the dextran, dextran derivative, or both has a molecular weight of 10,000 to 40,000.

* * * * *